(12) United States Patent
Nakamura et al.

(10) Patent No.: US 12,234,067 B2
(45) Date of Patent: Feb. 25, 2025

(54) TRANSPORT STRUCTURE FOR LEAD-ACID BATTERY

(71) Applicant: GS Yuasa International Ltd., Kyoto (JP)

(72) Inventors: Yuya Nakamura, Shizuoka (JP); Yu Kojima, Shizuoka (JP)

(73) Assignee: GS Yuasa International Ltd., Kyoto (JP)

( * ) Notice: Subject to any disclaimer, the term of this patent is extended or adjusted under 35 U.S.C. 154(b) by 4 days.

(21) Appl. No.: 18/036,589

(22) PCT Filed: Nov. 29, 2021

(86) PCT No.: PCT/JP2021/043565
§ 371 (c)(1),
(2) Date: May 11, 2023

(87) PCT Pub. No.: WO2022/114168
PCT Pub. Date: Jun. 2, 2022

(65) Prior Publication Data
US 2023/0399141 A1    Dec. 14, 2023

(30) Foreign Application Priority Data
Nov. 30, 2020    (JP) .................................. 2020-197770

(51) Int. Cl.
*B65D 5/50*    (2006.01)
*B65D 81/02*    (2006.01)
*H01M 10/06*    (2006.01)

(52) U.S. Cl.
CPC ............. *B65D 5/50* (2013.01); *B65D 81/02* (2013.01); *H01M 10/06* (2013.01)

(58) Field of Classification Search
CPC ...... B65D 5/50; B65D 5/5028; B65D 5/6605; B65D 81/02; B65D 81/113; B65D 81/264; B65D 2585/88; Y02E 60/10; H01M 10/06
(Continued)

(56) References Cited

U.S. PATENT DOCUMENTS 1,240,239 A * 9/1917 Moffett ................. H01M 50/00
                                                    229/122.34
1,882,565 A * 10/1932 Boeye ................. H01M 50/262
                                                    229/122.23
(Continued)

FOREIGN PATENT DOCUMENTS

GB    2062583 A    5/1981
JP    55-74622 U   5/1980
(Continued)

OTHER PUBLICATIONS

International Search Report (ISR) dated Feb. 8, 2022 filed in PCT/JP2021/043565.

*Primary Examiner* — Chun Hoi Cheung
*Assistant Examiner* — Brijesh V. Patel
(74) *Attorney, Agent, or Firm* — RANKIN, HILL & CLARK LLP

(57) ABSTRACT

A transport structure (1) for a lead-acid battery (10) includes: a packing box (20) in which a lead-acid battery (10) is packed, in which an upper wall portion (23) is formed by two flaps (24) extending from two first side wall portions (21) facing each other of the packing box (20), and in which a distal end portion (26) of at least one of the flaps (24) is bent and inserted into the packing box (20); and an upper buffer body (42A) disposed outside the upper wall portion (23), the upper buffer body (42A) including an upper wall portion (51) facing the upper wall portion (23).

9 Claims, 17 Drawing Sheets

(58) Field of Classification Search
USPC ............... 206/521, 594, 204, 703–705;
229/147–148; 588/249–260;
429/175–176; 53/467
See application file for complete search history.

(56) References Cited

U.S. PATENT DOCUMENTS

| | | | | |
|---|---|---|---|---|
| RE19,181 E | * | 5/1934 | Boeye | B65D 5/5023 206/705 |
| 1,965,215 A | * | 7/1934 | Boeye | H01M 50/262 229/125.32 |
| 2,022,595 A | * | 11/1935 | Gowing | H01M 50/271 206/703 |
| 2,536,442 A | * | 1/1951 | Reynolds | B65D 5/5035 229/125.17 |
| 2,578,107 A | * | 12/1951 | Thacker | B65D 5/5021 206/703 |
| 2,671,599 A | * | 3/1954 | Price | H01M 50/571 206/703 |
| 2,674,369 A | * | 4/1954 | Gilks | B65D 77/26 206/703 |
| 2,707,721 A | * | 5/1955 | Anderson | H01M 50/282 206/703 |
| 2,713,964 A | * | 7/1955 | Repking | H01M 50/271 206/703 |
| 2,779,527 A | * | 1/1957 | Fallert | B65D 5/5004 206/703 |
| 3,056,536 A | * | 10/1962 | Smith | B65D 77/26 206/703 |
| 3,146,132 A | * | 8/1964 | Sanford | H01M 50/262 206/703 |
| 3,189,176 A | * | 6/1965 | Boeye | B65D 77/26 206/703 |
| 3,483,041 A | * | 12/1969 | Kalen | H01M 6/32 206/703 |
| 3,580,467 A | * | 5/1971 | Pieszak | B65D 85/30 206/319 |
| 3,765,527 A | * | 10/1973 | Vargo | B65D 5/48002 206/703 |
| 3,767,038 A | * | 10/1973 | Channing | G09F 3/0288 283/79 |
| 3,802,220 A | * | 4/1974 | Pompo | F25D 3/00 62/457.2 |
| 4,323,156 A | * | 4/1982 | Grueneberg | B65D 5/5004 206/703 |
| 5,145,070 A | * | 9/1992 | Pallett | B65D 5/5004 206/592 |
| 5,160,025 A | * | 11/1992 | Greenawald | B65D 81/264 206/703 |
| 5,226,555 A | * | 7/1993 | Kovaleski | B65D 5/566 206/703 |
| 5,366,080 A | * | 11/1994 | Carstersen | B65D 81/113 206/719 |
| 5,515,976 A | * | 5/1996 | Moren | B65D 81/133 206/592 |
| 5,641,068 A | * | 6/1997 | Warner | B65D 5/509 206/593 |
| 5,706,951 A | * | 1/1998 | Oinuma | H01L 21/67396 206/592 |
| 5,715,940 A | * | 2/1998 | Son | B65D 81/133 206/592 |
| 6,405,873 B2 | * | 6/2002 | Koike | B65D 81/025 206/592 |
| 6,557,706 B2 | * | 5/2003 | Bowers | B65D 5/5004 206/703 |
| 7,328,800 B2 | * | 2/2008 | Koike | B65D 5/58 206/592 |
| 7,494,014 B2 | * | 2/2009 | Martinez | B65D 5/48038 206/499 |
| 7,748,539 B2 | * | 7/2010 | Onda | H01L 21/67369 206/592 |
| 8,439,197 B2 | * | 5/2013 | Yajima | B65D 81/133 206/592 |
| 8,720,731 B2 | * | 5/2014 | Tsuyuki | B65D 81/056 229/117.35 |
| 8,820,532 B2 | * | 9/2014 | Shannon | B65D 53/00 206/204 |
| 9,688,463 B2 | * | 6/2017 | Tuet | B65D 81/07 |
| 9,850,055 B2 | * | 12/2017 | Nagashima | B65D 81/113 |
| 10,906,719 B2 | * | 2/2021 | Pincus | B65D 81/058 |
| 10,988,302 B1 | * | 4/2021 | Madigan | B65D 11/10 |
| 2013/0266848 A1 | | 10/2013 | Shannon et al. | |
| 2015/0295212 A1 | | 10/2015 | Hwangbo | |

FOREIGN PATENT DOCUMENTS

| | | |
|---|---|---|
| JP | 56-96455 A | 8/1981 |
| JP | 2-11069 U | 1/1990 |
| JP | 6-32348 A | 2/1994 |
| JP | 2956357 B2 * | 10/1999 |
| JP | 2000-255549 A | 9/2000 |
| JP | 2001151282 A * | 6/2001 |
| JP | 2001185104 A * | 7/2001 |
| JP | 2002-2769 A | 1/2002 |
| JP | 2002160769 A * | 6/2002 |
| JP | 2005-22680 A | 1/2005 |
| JP | 2005-313942 A | 11/2005 |
| JP | 2007220556 A * | 8/2007 |
| JP | 2009035269 A * | 2/2009 |
| JP | 2010238522 A * | 10/2010 |

* cited by examiner

TRANSPORT STRUCTURE FOR LEAD-ACID BATTERY

TECHNICAL FIELD

The technology disclosed in the present specification relates to a transport structure for a lead-acid battery.

BACKGROUND ART

Conventionally, when an object to be transported is transported, a buffer body is disposed around the object to be transported to protect the object from an impact during transportation (see, for example, Patent Document 1). Specifically, the packaging structure described in Patent Document 1 includes a bottom box made of a cardboard plate, lower buffer bodies that are stored on both sides of the bottom box and receive both sides of a lower end of a main body portion of an object to be packaged (corresponding to an object to be transported), upper buffer bodies that are applied to both sides of an upper end of the main body portion of the object to be packaged received by the lower buffer bodies, and a main body box made of a cardboard plate whose lower end is opened to cover all of them.

PRIOR ART DOCUMENT

Patent Document

Patent Document 1: JP-A-2005-313942

SUMMARY OF THE INVENTION

Problems to be Solved by the Invention

However, conventionally, there is room for improvement in buffering the impact when the object to be transported falls during transportation.

The present specification discloses a technique for preventing a lead-acid battery from falling and being damaged during transportation when the lead-acid battery is transported as an object to be transported.

Means for Solving the Problems

A transport structure for a lead-acid battery includes: a packing box in which a lead-acid battery is packed, in which a second wall portion is formed by two flaps extending from two first wall portions facing each other of the packing box, and in which a distal end portion of at least one of the flaps is bent and inserted into the packing box; and a buffer body disposed outside the second wall portion, the buffer body including a third wall portion facing the second wall portion.

MODE FOR CARRYING OUT THE INVENTION

Figure 1:
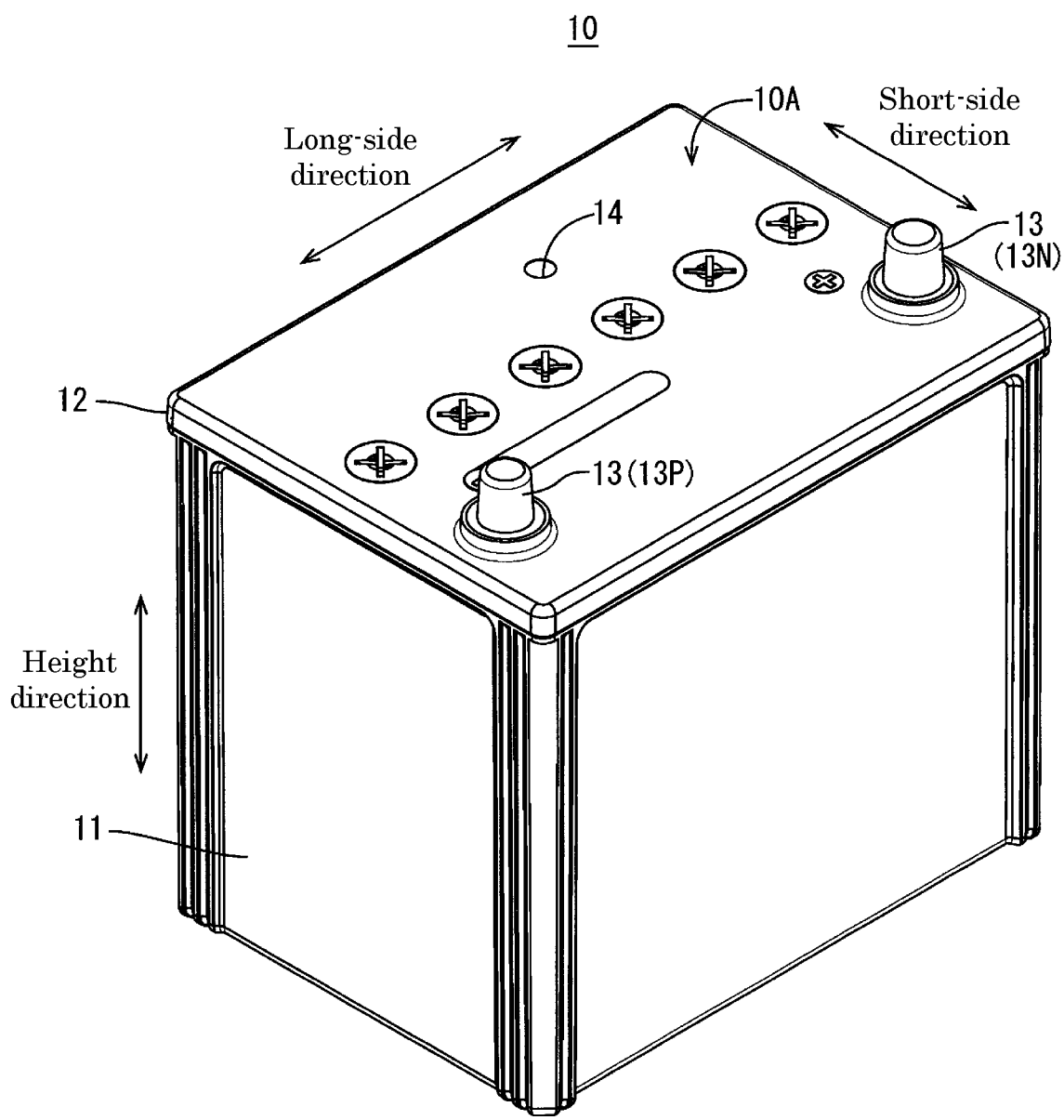
FIG. 1 is a perspective view of a lead-acid battery according to a first embodiment.

Outline of Present Embodiment (1) According to one aspect of the present invention, a transport structure for a lead-acid battery includes: a packing box in which a lead-acid battery is packed, in which a second wall portion is formed by two flaps extending from two first wall portions facing each other of the packing box, and in which a distal end portion of at least one of the flaps is bent and inserted into the packing box; and a buffer body disposed outside the second wall portion, the buffer body including a third wall portion facing the second wall portion.

(2) According to one aspect of the present invention, when the packing box falls in a posture in which a surface of the lead-acid battery facing the second wall portion faces downward, the distal end portion of the flap is sandwiched between the lead-acid battery and the third wall portion and crushed, so that an impact of the falling is buffered.

According to the above-described transport structure for a lead-acid battery, since the distal end portion of the flap is bent and inserted into the packing box, when the packing box falls in a posture in which the surface of the lead-acid battery facing the second wall portion of the packing box faces downward, the distal end portion of the flap is sandwiched between the lead-acid battery and the third wall portion and crushed, so that an impact of the falling is buffered. Therefore, according to the transport structure for the lead-acid battery, when the lead-acid battery is transported as an object to be transported, it is possible to suppress the lead-acid battery from falling and being damaged during transportation.

(3) According to one aspect of the present invention, the third wall portion may include a projecting portion projecting toward the second wall portion, and at least a part of the distal end portion of the flap may overlap the projecting portion when viewed from a direction orthogonal to a wall surface of the third wall portion.

According to the above-described transport structure for the lead-acid battery, since at least a part of the distal end portion of the flap overlaps the projecting portion when viewed in the direction orthogonal to the wall surface of the third wall portion, the distal end portion is sandwiched between the lead-acid battery and the projecting portion and crushed, so that the impact of the falling is buffered.

(4) According to one aspect of the present invention, the entire distal end portion of the flap may overlap the projecting portion as viewed from the direction orthogonal to the wall surface of the third wall portion.

According to the transport structure for the lead-acid battery, since the entire distal end portion of the flap overlaps the projecting portion when viewed from the direction orthogonal to the wall surface of the third wall portion, the impact of the falling is more reliably buffered as compared with a case where only a part of the distal end portion of the flap overlaps the projecting portion.

(5) According to one aspect of the present invention, a surface side of the projecting portion on a side opposite to a surface facing the second wall portion may be hollow.

According to the above-described transport structure for a lead-acid battery, since the surface side of the projecting portion on the side opposite to the surface facing the second wall portion is hollow, the projecting portion pressed downward by the lead-acid battery through the distal end portion of the flap is easily bent downward when the packing box falls in a posture in which the surface of the lead-acid battery facing the second wall portion of the packing box faces downward. For this reason, the projecting portion also functions as a cushion that buffers the impact. This further buffers the impact of the falling.

Furthermore, according to the above-described transport structure for a lead-acid battery, since the surface side of the projecting portion on the side opposite to the surface facing the second wall portion is hollow, when viewed from the projecting portion, a portion of the buffer body other than the projecting portion forms a recessed portion recessed to the side opposite to the second wall portion. Since the recessed portion is crushed when receiving an impact, the impact of the falling is further buffered.

(6) According to one aspect of the present invention, a terminal may be provided on a surface of the lead-acid battery facing the second wall portion, and the terminal and the projecting portion may not overlap when viewed from the direction orthogonal to the wall surface of the third wall portion.

According to the above-described transport structure for a lead-acid battery, when the packing box falls in a posture in which the surface of the lead-acid battery facing the second wall portion faces downward, the second wall portion is pressed downward by the terminal. At this time, since the terminal and the projecting portion do not overlap when viewed from the direction orthogonal to the wall surface of the third wall portion, the recessed portion of the buffer body is located below the terminal. For this reason, the second wall portion pressed downward by the terminal bends downward using the space of the recessed portion, thereby functioning as a cushion. As a result, the impact applied to the terminal is buffered, and the impact is dispersed to the entire second wall portion of the packing box. Therefore, it is possible to suppress the terminal from being damaged due to concentration of the impact on the terminal.

(7) According to one aspect of the present invention, the terminal may be provided on any one side in the short-side direction with a center in a short-side direction of the lead-acid battery as a reference or provided on any one side in a long-side direction with a center in a long-side direction of the lead-acid battery as a reference when viewed from a direction orthogonal to a wall surface of the third wall portion, and even when the buffer body is rotated by 180 degrees around a straight line perpendicular to the wall surface of the third wall portion and disposed, the terminal and the projecting portion may not overlap when viewed from the direction orthogonal to the wall surface of the third wall portion.

For example, it is assumed that the terminal is provided on any one side in the short-side direction with the center of the lead-acid battery in the short-side direction as a reference. In a case where the buffer body is disposed in the packing box in a certain direction, even when the terminal and the projecting portion do not overlap each other, when the buffer body is rotated by 180 degrees around the straight line perpendicular to the wall surface of the third wall portion and disposed, the terminal and the projecting portion overlap each other as viewed from the direction perpendicular to the wall surface of the third wall portion. In this case, when arranging the buffer body, an operator needs to carefully arrange the buffer body while paying attention to the direction so that the terminal and the projecting portion do not overlap, and thus, workability is deteriorated.

According to the above-described transport structure for a lead-acid battery, even when the buffer body is rotated by 180 degrees around the straight line perpendicular to the wall surface of the third wall portion and disposed, the terminal and the projecting portion do not overlap when viewed from the direction orthogonal to the wall surface of the third wall portion, so that an operator does not need to pay attention to the direction of the buffer body when disposing the buffer body. Therefore, operability is improved.

(8) According to one aspect of the present invention, a width of the distal end portion of the flap in the direction orthogonal to the wall surface of the third wall portion may be wider than a width of the terminal in the orthogonal direction.

When the width of the distal end portion of the flap in the direction orthogonal to the wall surface of the third wall portion is wider than the width of the terminal in the orthogonal direction, the lead-acid battery comes into contact with the distal end portion of the flap before the terminal comes into contact with the second wall portion, and the crushing of the distal end portion is started. For this reason, the damage to the terminal can be more reliably suppressed as compared with the case where the width of the distal end portion of the flap in the orthogonal direction is the same as the width of the terminal or narrower than the width of the terminal.

(9) According to one aspect of the present invention, the transport structure may further include: a fourth wall portion having a frame shape that is continuous with a peripheral edge portion of the third wall portion and surrounds the packing box; and a fifth wall portion having a frame shape that is connected to the fourth wall portion and surrounds the fourth wall portion, in which a space may be provided between the fourth wall portion and the fifth wall portion.

The packing box has a wall portion (for example, the first wall portion) continuous with the second wall portion at a right angle. When the packing box falls, the packing box may fall with its wall portion continuous at the right angle facing downward.

According to the above-described transport structure for a lead-acid battery, since the space is provided between the fourth wall portion and the fifth wall portion, when the packing box falls with its wall portion continuous at the right angle facing downward, the fifth wall portion bends using the space between the fifth wall portion and the fourth wall portion (or the fourth wall portion bends using the space between the fourth wall portion and the fifth wall portion), thereby functioning as a cushion that buffers the impact applied to the lead-acid battery. Therefore, it is possible to buffer the impact when the packing box falls with its wall portion continuous at the right angle facing downward.

(10) According to one aspect of the present invention, the third wall portion and the fourth wall portion may be recessed so as to be separated from a corner portion of the packing box.

When the packing box falls, the packing box may be inclined and collide with the floor from the corner portion. When the packing box collides with the floor from the corner portion, the impact concentrates on the corner portion of the lead-acid battery, and there is a possibility that the impact cannot be absorbed by the buffer body and the lead-acid battery is damaged. Conventionally, this has not been sufficiently studied. The corner portion of the packing box is a portion formed by two adjacent side surfaces of the packing box and an upper surface or a lower surface. That is, when the packing box has a rectangular parallelepiped shape, the corner portion corresponds to a corner vertex of the rectangular parallelepiped.

According to the above-described transport structure for a lead-acid battery, since the third wall portion and the fourth wall portion are recessed so as to be separated from the corner portion of the packing box, it is possible to suppress concentration of an impact on the corner portion of the lead-acid battery when the lead-acid battery falls to the floor with its corner portion facing downward. Therefore, it is possible to reduce the possibility that the impact concentrates on the corner portion and the lead-acid battery is damaged.

(11) According to one aspect of the present invention, the buffer body may be made of pulp mold.

When the lead-acid battery falls, the lead-acid battery may be damaged, and the electrolyte solution may leak out. As a result of intensive studies, the inventor of the present application has found that if the buffer body is made of pulp mold, even if the electrolyte solution leaks out, the leaked electrolyte solution can be absorbed to some extent by the buffer body.

According to the above-described transport structure for a lead-acid battery, since the buffer body is made of pulp mold, even if the electrolyte solution leaks, the electrolyte solution can be absorbed to some extent by the buffer body made of pulp mold. Therefore, according to the above-described transport structure for a lead-acid battery, when the lead-acid battery falls during transportation and the lead-acid battery is damaged, leakage of the electrolyte solution can be more reliably suppressed.

First Embodiment

A first embodiment will be described with reference to FIGS. 1 to 16. In the following description, the up-down direction, the left-right direction, and the front-rear direction are based on the up-down direction, the left-right direction, and the front-rear direction illustrated in FIG. 1. In the following description, reference numerals of the drawings may be omitted for the same components except for a part thereof.

(1) Lead-Acid Battery

A lead-acid battery 10 according to the first embodiment will be described with reference to FIG. 1. The lead-acid battery 10 is a lead-acid battery for starting an engine that is mounted on an automobile and supplies electric power to an engine starter (cell motor). The application of the lead-acid battery 10 is not limited to the engine starting use, and the lead-acid battery can be used for an idling stop vehicle, an auxiliary battery for starting a hybrid system, or other applications.

The lead-acid battery 10 has a rectangular shape in top view. The lead-acid battery 10 includes a container 11 made of synthetic resin and having an upper side opened, and a lid member 12 made of synthetic resin and closing an opening of the container 11. An element and an electrolyte solution are accommodated in the container 11.

Two terminals 13 (a positive electrode external terminal 13P and a negative electrode external terminal 13N) protruding upward are provided on an upper surface of the lid member 12. A positive electrode of the element is connected to the positive electrode external terminal 13P, and a negative electrode of the element is connected to the negative electrode external terminal 13N.

The two terminals 13 are disposed to be separated from each other in the long-side direction of the lead-acid battery 10 in top view, and are disposed on any one side (front side in the example illustrated in FIG. 1) in the short-side direction with respect to the center in the short-side direction of the lead-acid battery 10. A gas vent hole 14 for releasing gas generated in the lead-acid battery 10 is formed in the lid member 12.

An upper surface 10A of the lead-acid battery 10 is a surface facing an upper wall portion 23 (an example of a second wall portion) of a packing box 20 (see FIG. 2) to be described later.

(2) Transport Structure for Lead-Acid Battery

Figure 2:
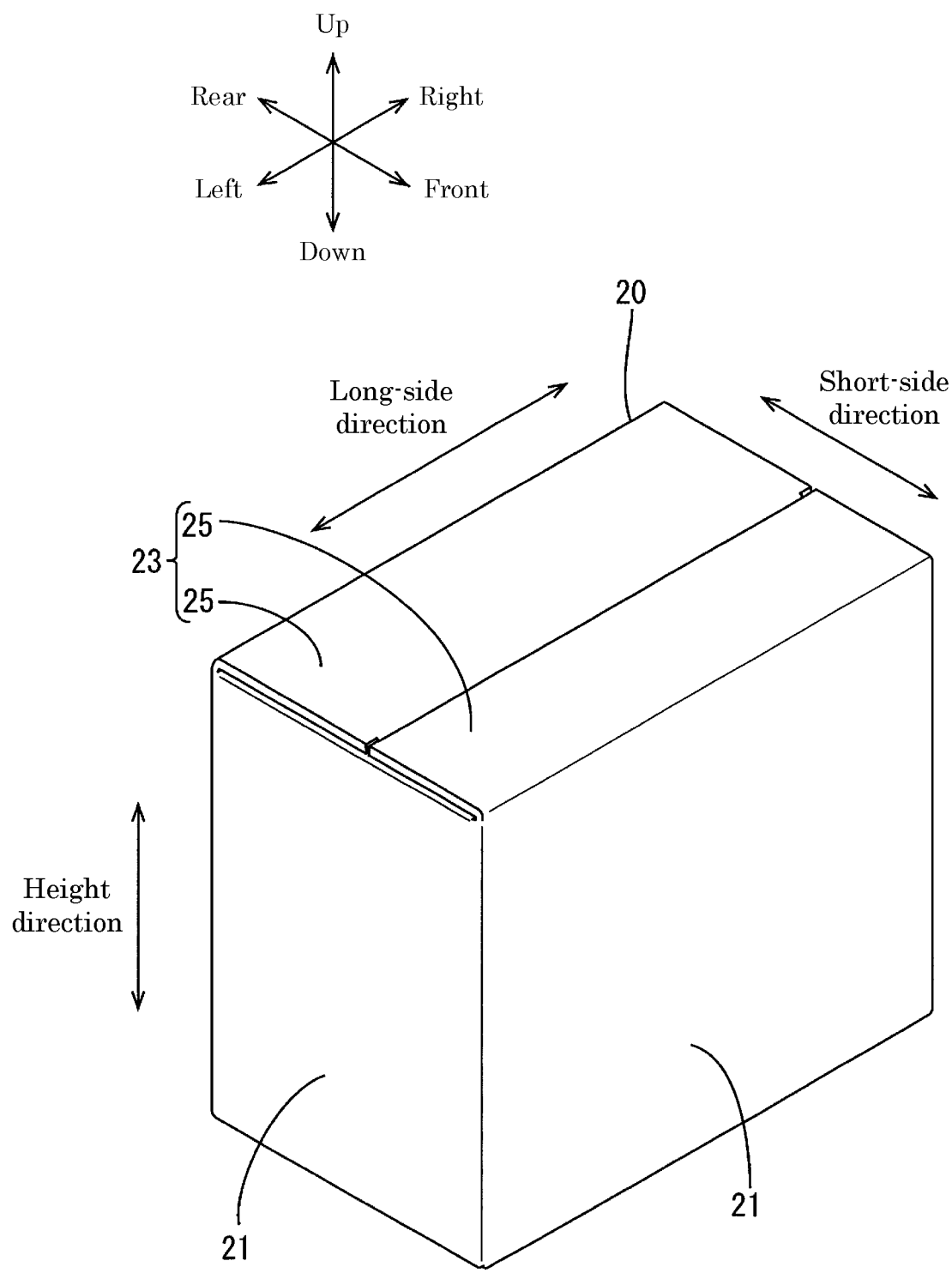
FIG. 2 is a perspective view of a packing box in which the lead-acid battery is packed.

As illustrated in FIG. 2, the lead-acid battery 10 for replacement of a lead-acid battery mounted on an automobile is packed in the packing box 20 (an example of an inner box) and sold. The packing box 20 is made of cardboard, and is formed in a rectangular parallelepiped shape having four side wall portions 21, a bottom wall portion 22 (see FIG. 4), and an upper wall portion 23 (an example of a second wall portion). The side wall portions 21 are examples of wall portions continuous with the second wall portion at a right angle.

Figure 3:
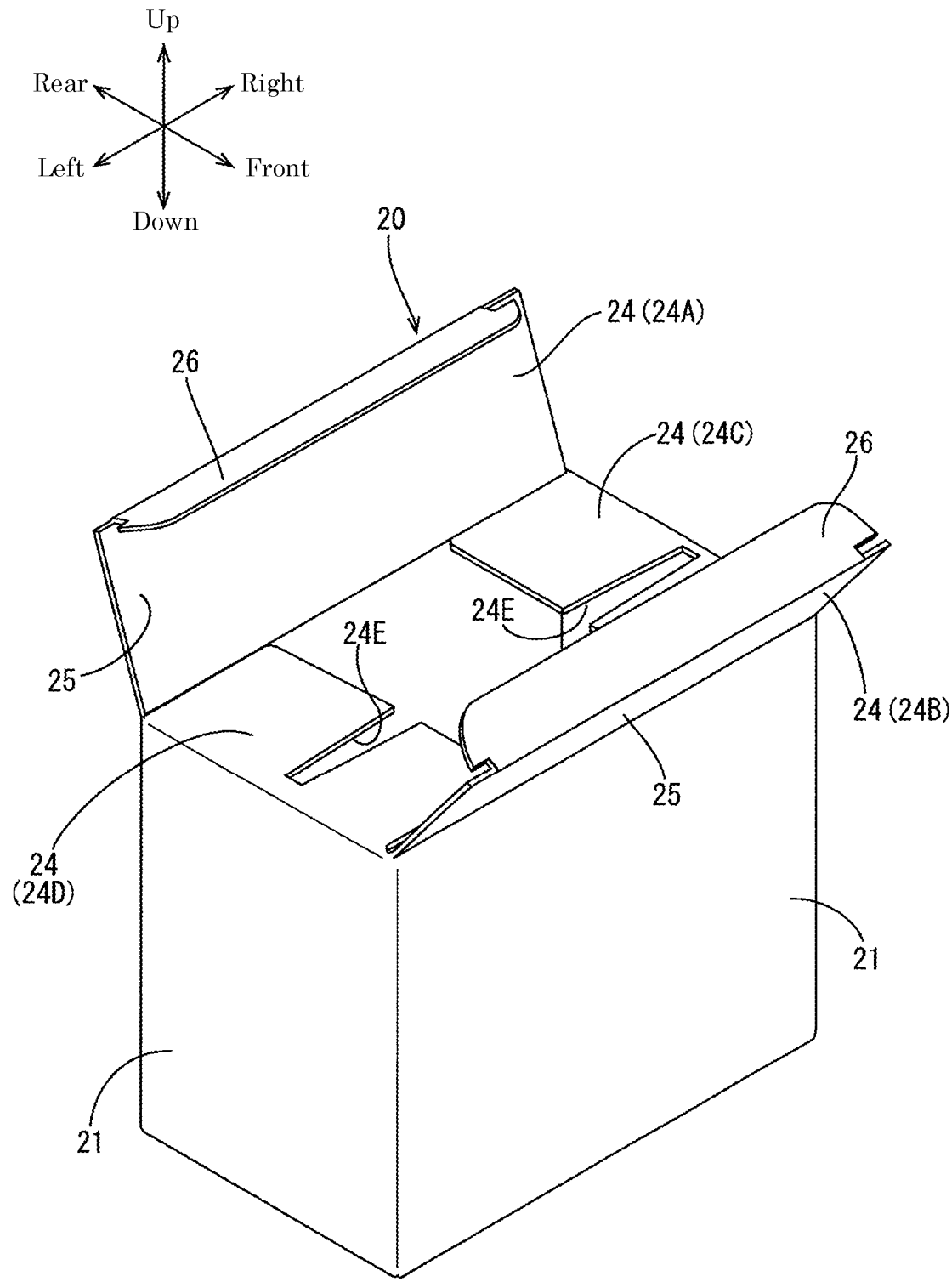
FIG. 3 is a perspective view of the packing box.

As illustrated in FIG. 3, flaps 24 (24A, 24B, 24C, and 24D) extend from the upper sides of the four side wall portions 21, respectively. The two flaps 24A and 24B extending from the side wall portions 21 (examples of first side wall portions) having a wider width in the lateral direction among the four flaps 24 form the upper wall portion 23 of the packing box 20. These two flaps 24A and 24B include a portion 25 forming the upper wall portion 23 and a distal end portion 26 continuous with a distal end of the portion 25 forming the upper wall portion 23, and the distal end portion 26 is bent by approximately 90 degrees.

In the flaps 24C and 24D extending from the side wall portions 21 having a narrower width in the lateral direction among the four flaps 24, a slit 24E extending in the left-right direction is formed at a position slightly shifted forward from the substantially center in the front-rear direction.

Figure 4:
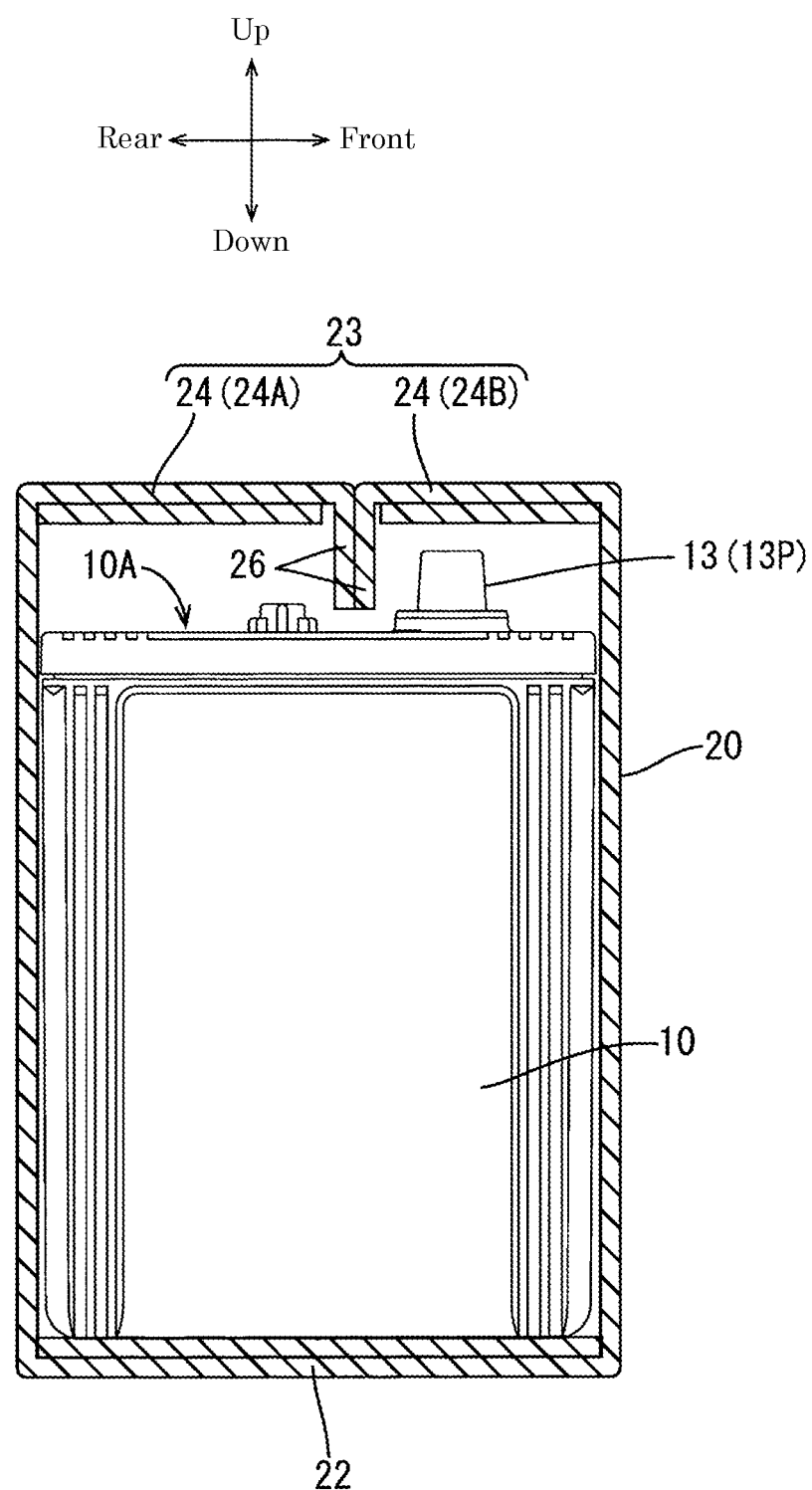
FIG. 4 is a cross-sectional view of the packing box.
Figure 5:
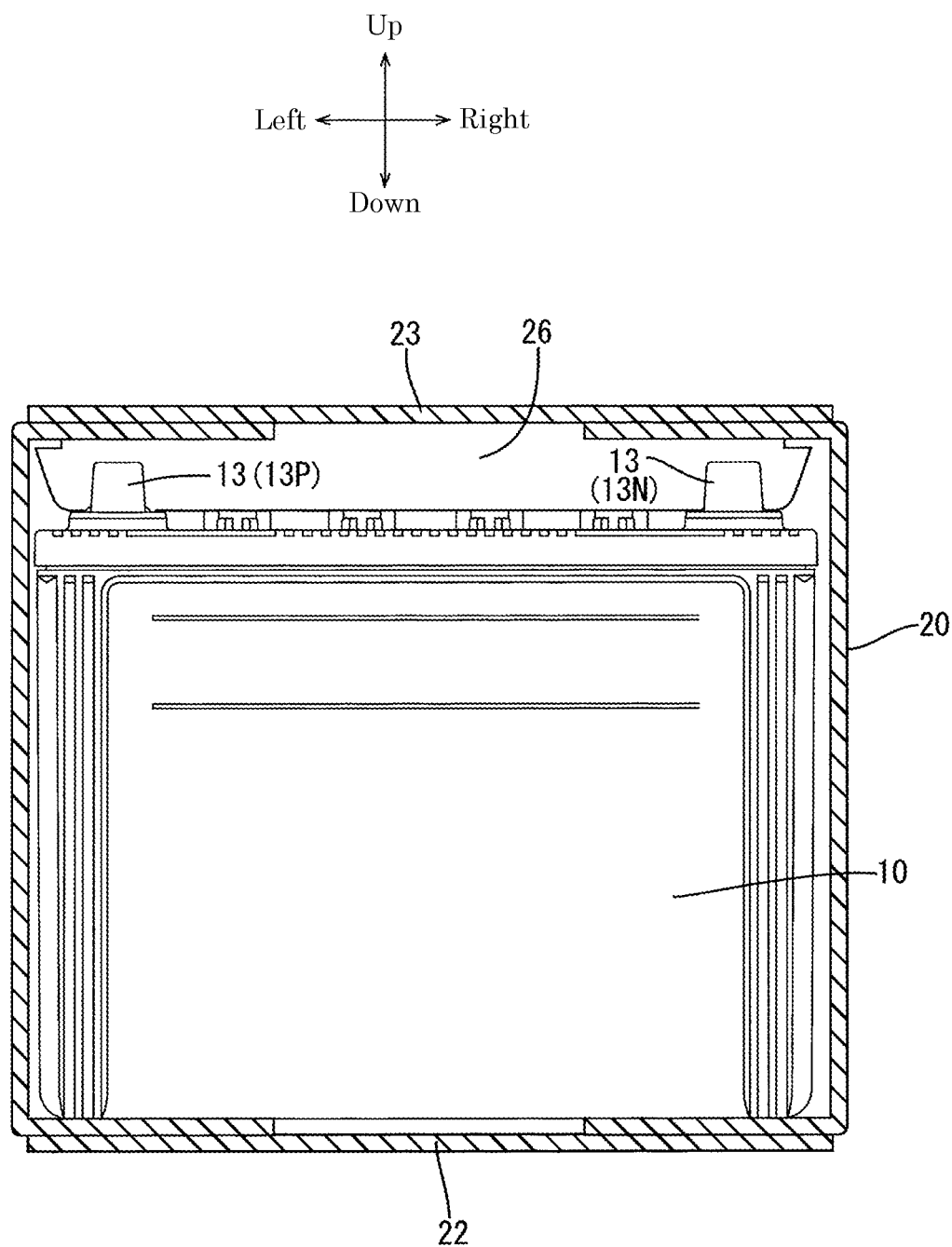
FIG. 5 is a cross-sectional view of the packing box.

As illustrated in FIGS. 4 and 5, the distal end portions 26 bent by approximately 90 degrees pass through the slits 24E formed in the flaps 24C and 24D and are inserted into the packing box 20. The lower ends of the distal end portions 26 inserted into the packing box 20 are located slightly above the upper surface 10A of the lead-acid battery 10.

As illustrated in FIGS. 4 and 5, the width of the distal end portion 26 of the flap 24 in the up-down direction is wider than the width of the terminal 13 in the up-down direction. The width of the distal end portion 26 in the up-down direction may be the same as the width of the terminal 13 in the up-down direction, or may be narrower than the width of the terminal 13 in the up-down direction.

Figure 6:
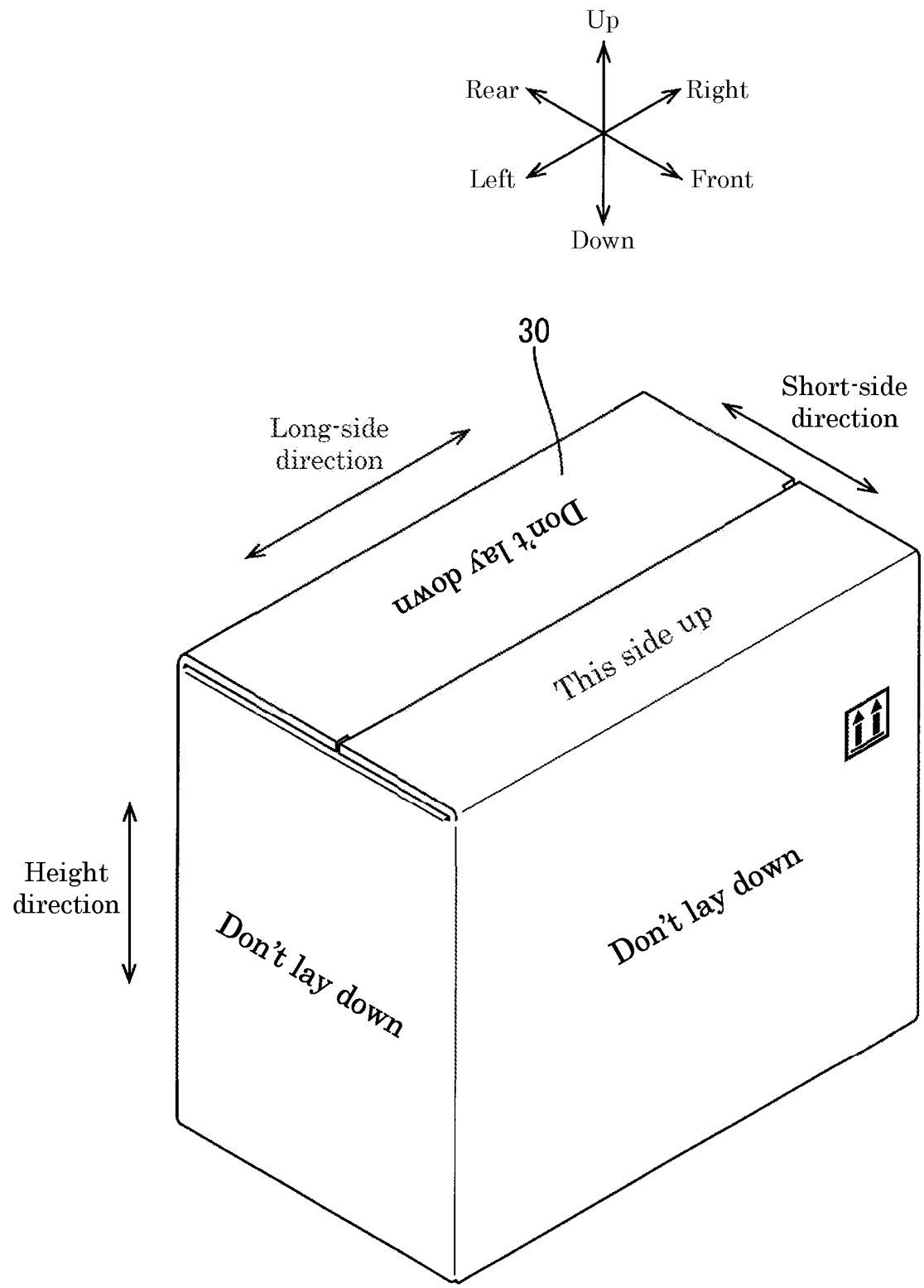
FIG. 6 is a perspective view of a transport box.

As illustrated in FIG. 6, when the lead-acid battery 10 for replacement is transported by air transportation or the like, the packing box in which the lead-acid battery 10 is packed is accommodated in an individual transport box 30 and transported. The transport box 30 is also made of cardboard.

Figure 7:
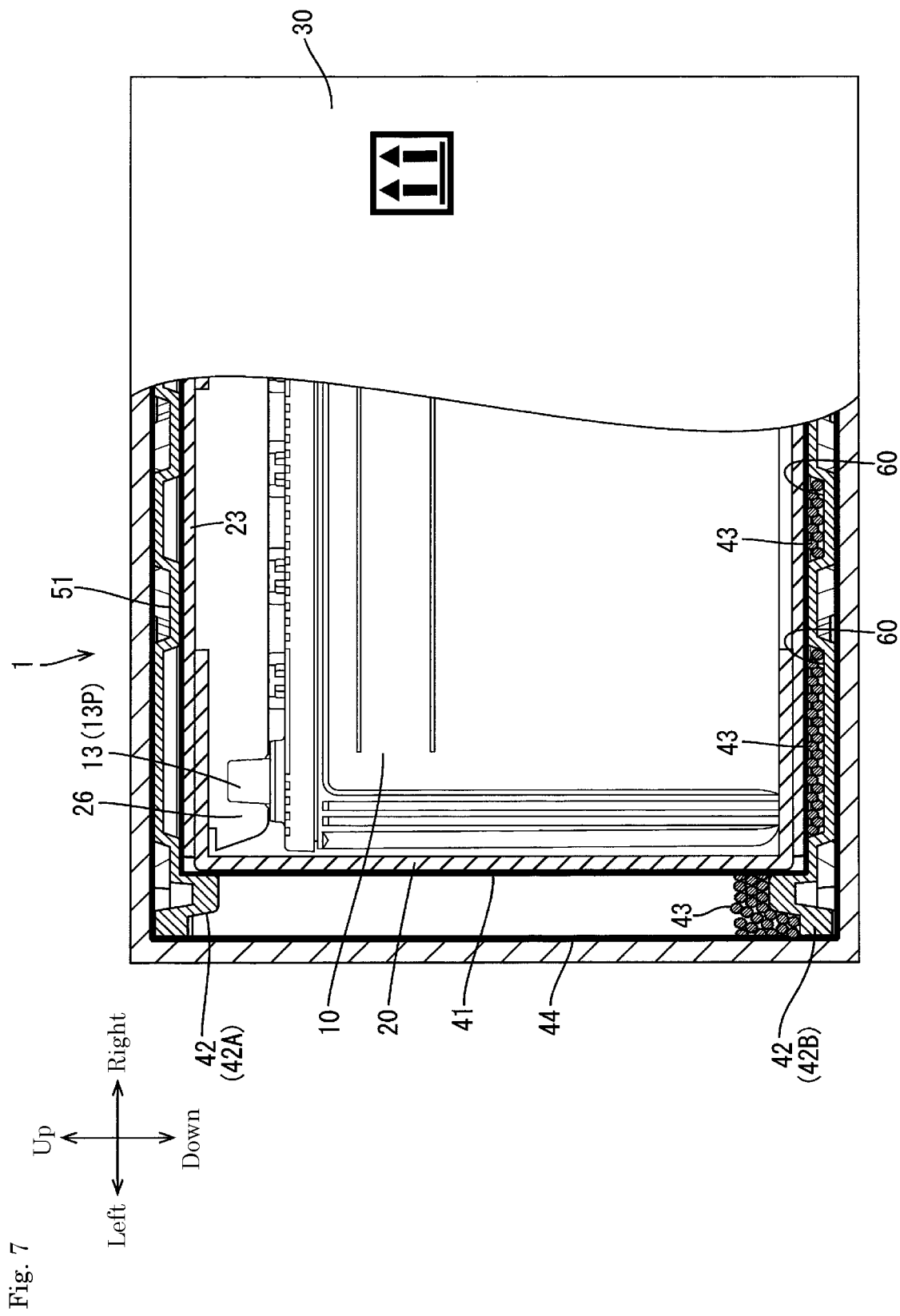
FIG. 7 is a partial cross-sectional view of a transport structure of a lead-acid battery (a cross-sectional view taken along line B-B illustrated in FIG. 11).

As illustrated in FIG. 7, a transport structure 1 for the lead-acid battery 10 includes the packing box 20 in which the lead-acid battery 10 is packed, an inner bag 41 made of vinyl, two buffer bodies 42 disposed on upper and lower sides, a granular absorbent material 43, an outer bag 44 made of vinyl, and a transport box 30.

The packing box 20 is accommodated in the transport box 30 in a state of being put in the inner bag 41. The inner bag 41 is for preventing the electrolyte solution from leaking to the outside of the transport box 30 in a case where the lead-acid battery 10 is inclined during transportation and the electrolyte solution leaks from the gas vent hole 14, a case where the lead-acid battery 10 is damaged due to an impact of the transport box 30 falling during transportation and the electrolyte solution leaks, or the like. The opening portion of the inner bag 41 is folded and fixed with an adhesive tape.

The two buffer bodies 42 are for buffering an impact when the transport box 30 falls due to load collapse or the like during transportation. The two buffer bodies 42 have the same shape. One of the two buffer bodies 42 is disposed on the lower side of the packing box 20 put in the inner bag 41. The other of the buffer bodies 42 is disposed on the upper side of the packing box 20 put in the inner bag 41. In the following description, the buffer body 42 disposed on the upper side is referred to as an upper buffer body 42A, and the buffer body 42 disposed on the lower side is referred to as a lower buffer body 42B. A specific configuration of the buffer body 42 will be described later.

The granular absorbent material 43 is for absorbing the leaked electrolyte solution when the electrolyte solution leaked out from the lead-acid battery 10 leaks out from the inner bag 41. The granular absorbent material 43 is, for example, mica crushed into particles. The granular absorbent material 43 is not limited to mica, and can be appropriately selected. As will be described in detail later, the lower buffer body 42B has recessed portions 60 recessed downward. The absorbent material 43 is also accommodated in the recessed portions 60 of the lower buffer body 42B.

The outer bag 44 is for preventing the leaked electrolyte solution from leaking out to the outside when the electrolyte solution leaks out from the inner bag 41. The opening portion of the outer bag 44 is folded and fixed with an adhesive tape.

(3) Falling of Transport Box

Figure 8:
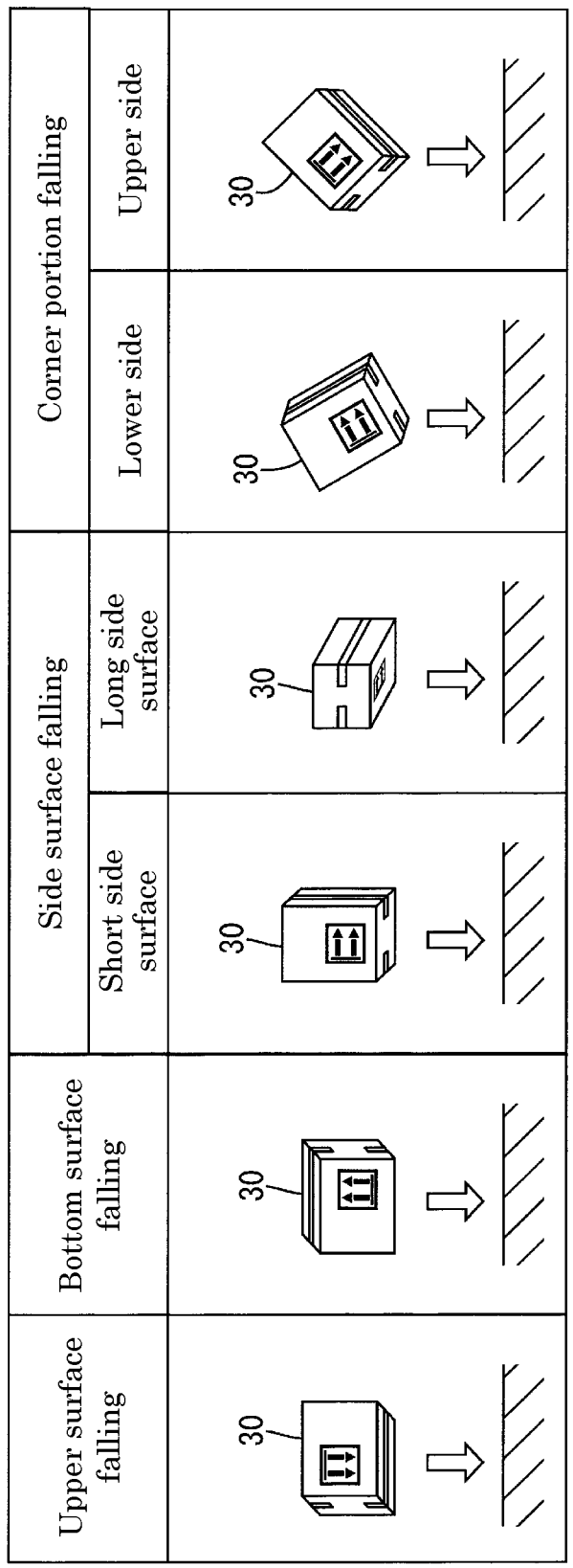
FIG. 8 is a schematic view illustrating a form of falling of the transport box.

Falling of the transport box 30 will be described with reference to FIG. 8. As described above, the transport box 30 may fall due to load collapse or the like during transportation. The form of falling of the transport box 30 includes upper surface falling, bottom surface falling, side surface falling, and corner portion falling.

The upper surface falling is a form in which the transport box 30 falls with its upper surface facing downward. In other words, the upper surface falling is a form in which the upper surface 10A for the lead-acid battery 10 (the surface of the lead-acid battery 10 facing the upper wall portion 23 of the packing box 20) falls in a posture facing downward.

The bottom surface falling is a form in which the transport box 30 falls with its bottom surface facing downward.

The side surface falling is a form in which the transport box 30 falls with its side surface facing downward. In other words, the side surface falling is a form in which the packing box 20 falls with its wall portion (side wall portion 21) continuous at a right angle with the second wall portion (upper wall portion 23) facing downward. The side surfaces of the transport box 30 include a short side surface having a narrower width in the horizontal direction and a long side surface having a wider width in the horizontal direction. The side surface falling includes a case where the transport box 30 falls with its short side surface facing downward and a case where the transport box 30 falls with its long side surface facing downward.

The corner portion falling is a form in which when the transport box 30 falls, the transport box 30 is inclined and collides with the floor from the corner portion. The corner portion falling includes a case where the transport box 30 falls with its lower corner portion facing downward and a case where the transport box 30 falls with its upper corner portion facing downward.

When the transport box 30 falls, the lead-acid battery 10 may be damaged by the impact at the time of grounding, and the electrolyte solution stored inside may leak out. A standard of a falling test is set for marine products transported by an aircraft or a ship in order to ensure safety of the aircraft or the ship. According to this standard, it is required that the lead-acid battery 10 is not damaged even if the transport box 30 accommodating the lead-acid battery 10 is caused to fall from a height of about 1.3 m to 1.6 m.

(4) Configuration of Buffer Body

The buffer body 42 will be described with reference to FIGS. 9 to 14. As described above, since the upper buffer body 42A and the lower buffer body 42B have the same shape, the upper buffer body 42A will be described as an example. For convenience, FIGS. 9 to 11, 13, and 14 illustrate the upper buffer body 42A upside down. In the following description, "upper" means "lower" in a state where the upper buffer body 42A is disposed on the packing box 20. The same applies to "lower", and "lower" refers to "upper" in a state where the upper buffer body 42A is disposed on the packing box 20.

The upper buffer body 42A is made of pulp mold. Pulp mold includes soft mold and hard mold harder than soft mold. The upper buffer body 42A is a hard mold.

Figure 9:
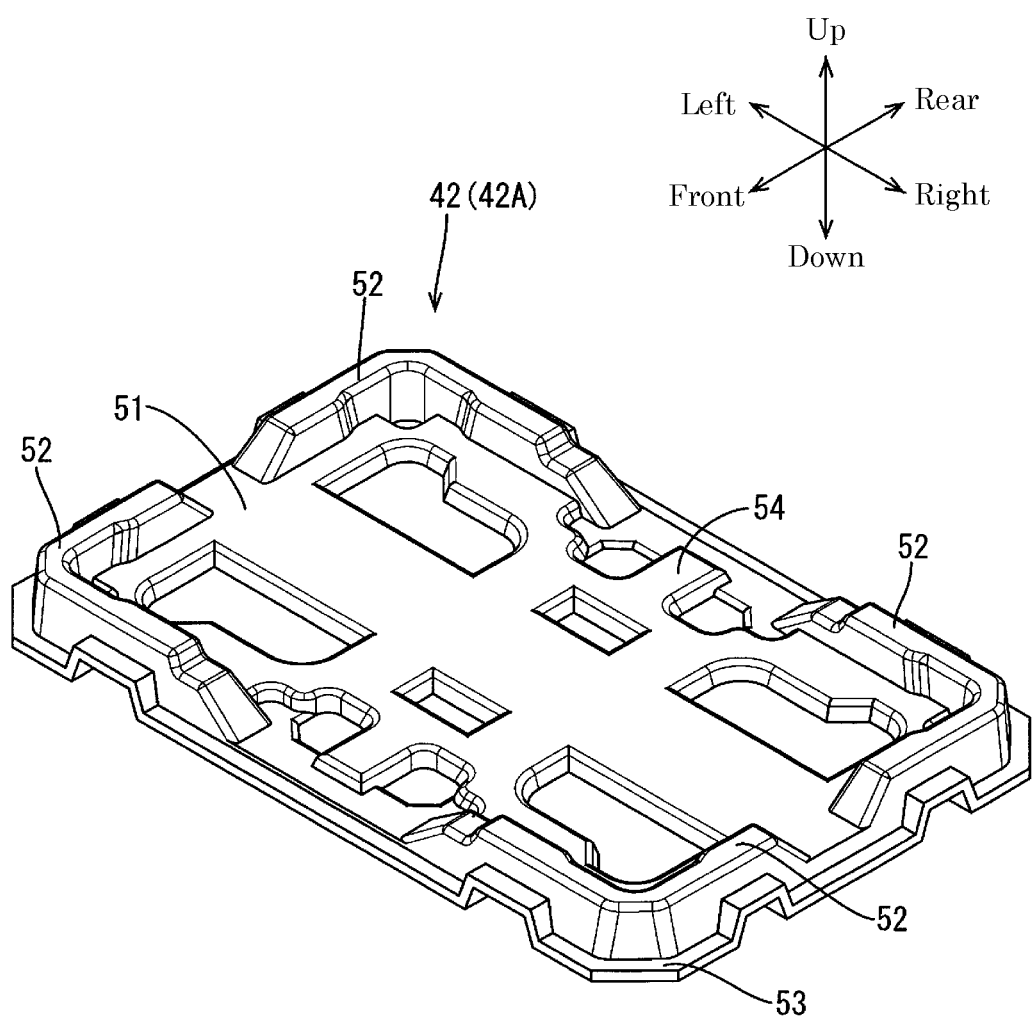
FIG. 9 is a perspective view of an upper buffer body as viewed from above.

As illustrated in FIG. 9, the shape of the upper buffer body 42A is front-back symmetrical and left-right symmetrical. The upper buffer body 42A includes an upper wall portion 51 (an example of a third wall portion) facing the upper wall portion 23 (second wall portion) of the packing box 20 in a state where the upper buffer body 42A is disposed on the packing box 20, a frame portion 52 having a substantially frame shape rising from a peripheral edge portion of the upper wall portion 51, and a flange portion 53 projecting in the horizontal direction from the frame portion 52 over the entire periphery. The inner peripheral shape of the frame portion 52 substantially matches the peripheral shape of the packing box 20. The thicknesses of the walls of the upper wall portion 51 and the flange portion 53 are about 5 mm to 6 mm.

Figure 10:
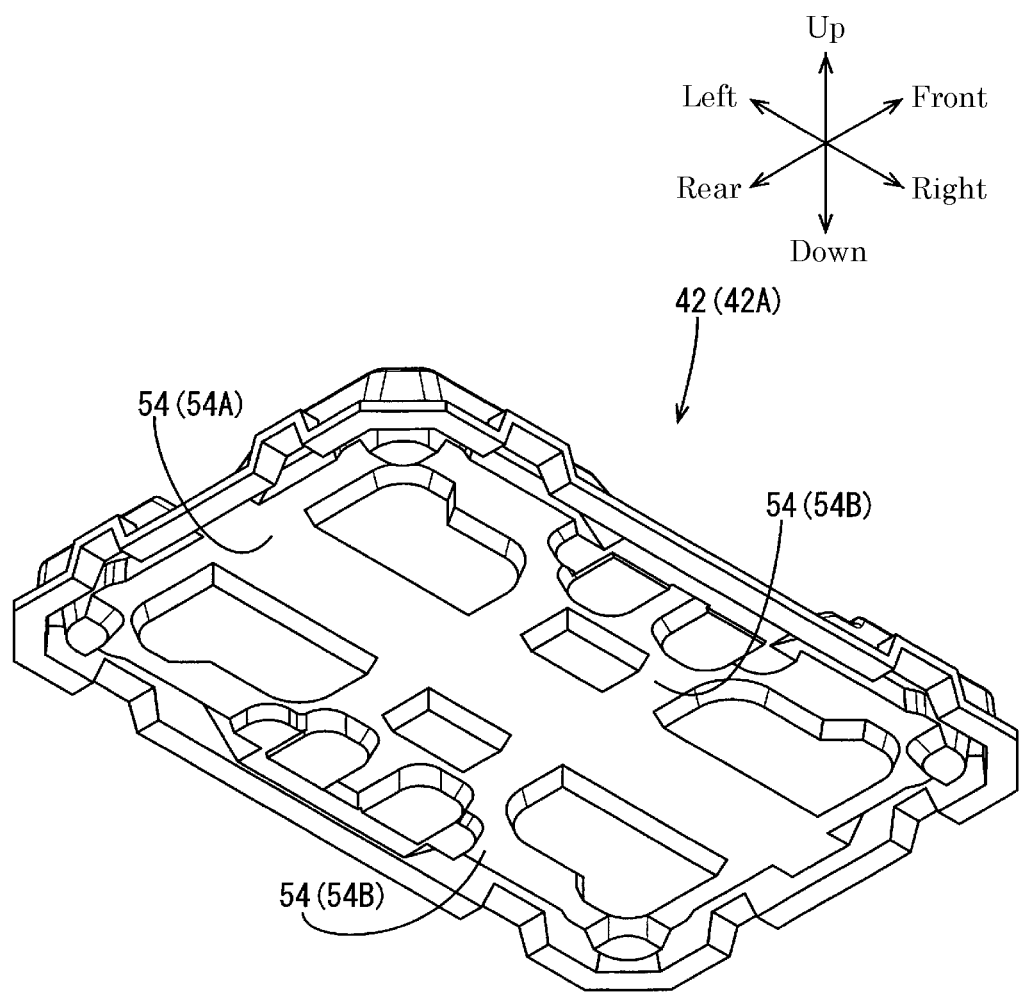
FIG. 10 is a perspective view of the upper buffer body as viewed from below.

The upper wall portion 51 has a projecting portion 54 projecting upward (upper wall portion 23 side of the packing box 20 in a state where the upper buffer body 42A is disposed on the packing box 20). As illustrated in FIG. 10, the projecting portion 54 is recessed upward when viewed from the lower side. That is, the surface side of the projecting portion 54 on the side opposite to the surface facing the upper wall portion 23 is hollow. The area of the projecting portion 54 is preferably 50% or more and 80% or less of the area of the upper wall portion 51.

Figure 11:
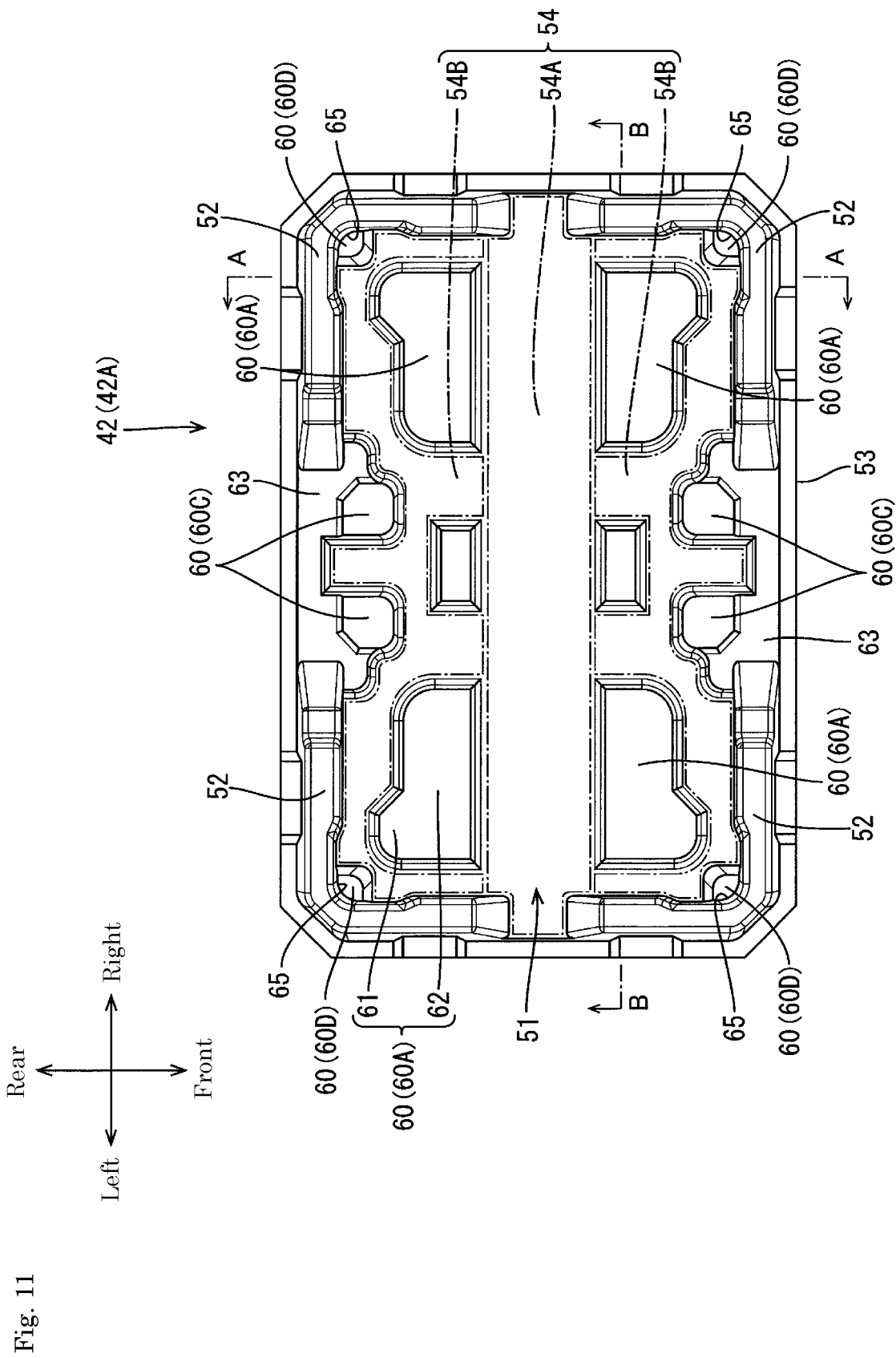
FIG. 11 is a top view of the upper buffer body.

As illustrated in FIG. 11, the projecting portion 54 includes a first projecting portion 54A extending in the left-right direction at the center in the front-rear direction, and a second projecting portion 54B continuous with both front and rear sides of the first projecting portion 54A. For easy understanding, in FIG. 11, the first projecting portion 54A and the second projecting portion 54B are indicated by alternate long and short dash lines. The first projecting portion 54A has a certain width in the front-rear direction. Specifically, the width of the first projecting portion 54A in the front-rear direction is about ⅓ to ¼ of the width of the upper wall portion 51 in the front-rear direction.

As described above, since the surface side of the projecting portion 54 on the side opposite to the surface facing the upper wall portion 23 is hollow, when viewed from the projecting portion 54, portions of the upper wall portion 51 other than the projecting portion 54 form the recessed portions 60 recessed downward (on the side opposite to the upper wall portion 23). Specifically, the recessed portions 60 include four first recessed portions 60A, two second recessed portions 60B, four third recessed portions and four fourth recessed portions 60D.

Four first recessed portions 60A are formed so that two first recessed portions 60A are located on each of front and rear sides across the first projecting portion 54A. The two first recessed portions 60A on the same side in the front-rear direction across the first projecting portion 54A are separated from each other in the left-right direction. To describe the left rear first recessed portion 60A as an example, the first recessed portion 60A has a shape having a rectangular portion 62 elongated in the left-right direction and an expanded portion 61 expanded from the left rear to the rear side of the rectangular portion 62.

The two second recessed portions 60B are formed on both front and rear sides of the first projecting portion 54A at the center in the left-right direction. The second recessed portion 60B is provided adjacent to the first projecting portion 54A. The second recessed portion 60B has a rectangular shape elongated in the left-right direction.

The four third recessed portions 60C are formed so that two third recessed portions 60C are located in front of and behind the first projecting portion 54A. Specifically, the two third recessed portions 60C on the front side are provided at positions separated to the front side from the first projecting portion 54A, and are provided to be separated to the left and right across the center in the left-right direction. The same applies to the two third recessed portions 60C on the rear side.

Here, in the upper wall portion 51, a middle step portion 63 is formed on the front side of the two third recessed portions 60C on the front side. The upper surface of the middle step portion 63 is lower than the upper surface of the first projecting portion 54A and higher than the bottom surface of the recessed portion 60. Similarly, the middle step portion 63 is provided on the rear side of the two third recessed portions 60C on the rear side.

The four fourth recessed portions 60D are formed at inner corners of the frame portion 52 having a substantially frame shape when viewed from above. Recessed portions 65 recessed outward are formed at four inner corners of the frame portion 52. Therefore, when the upper buffer body 42A is disposed on the packing box 20, the upper corner portions of the packing box 20 are separated from both the upper wall portion 51 and the frame portion 52.

Figure 15:
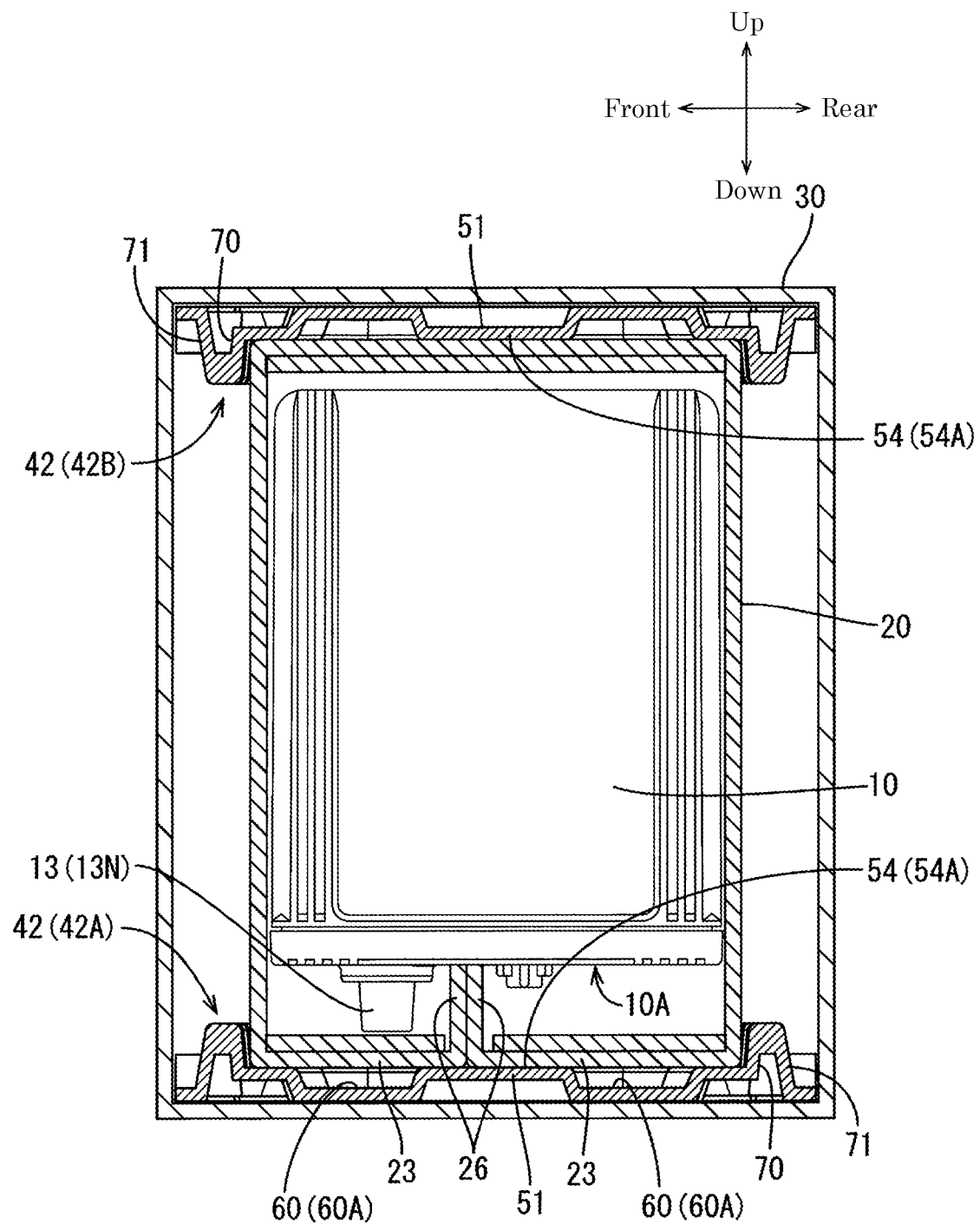
FIG. 15 is a cross-sectional view of the transport box that has fallen with its upper surface facing downward.
Figure 16:
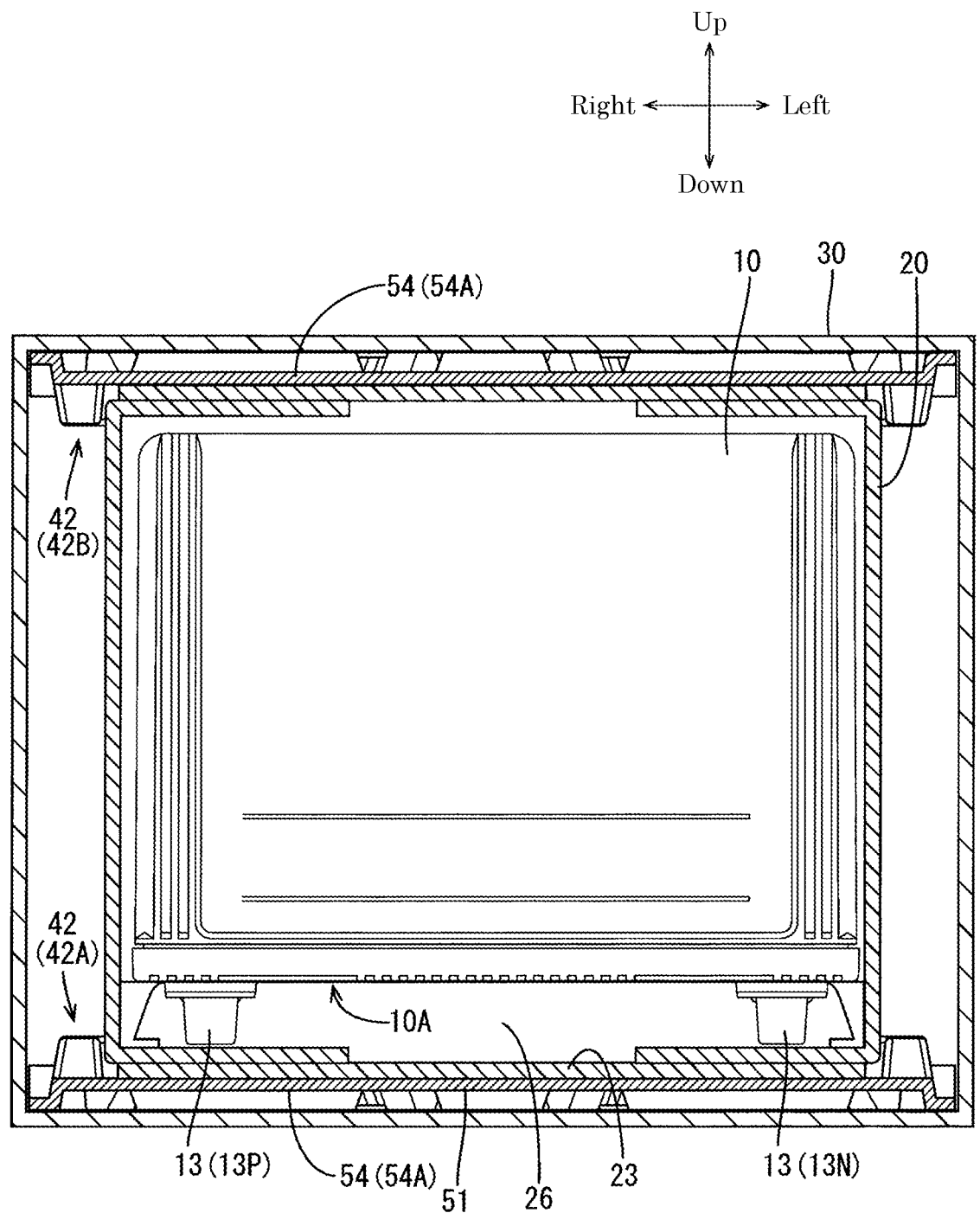
FIG. 16 is a cross-sectional view of the transport box that has fallen with its upper surface facing downward.

The positional relationship between the distal end portions 26 of the flaps 24 and the first projecting portion 54A will be described with reference to FIGS. 15 and 16. FIGS. 15 and 16 illustrate a case where the transport box 30 falls with its upper surface facing downward. In FIGS. 15 and 16, the inner bag 41, the outer bag 44, and the absorbent material 43 are omitted. As illustrated in FIG. 15, when the transport box 30 falls with its upper surface facing downward, the distal end portions 26 of the flaps 24 are located directly above the first projecting portion 54A. More specifically, as illustrated in FIG. 16, the distal end portions 26 are located directly above the first projecting portion 54A over the entire width in the left-right direction. In other words, the entire distal end portions 26 overlap the first projecting portion 54A when viewed in the up-down direction (direction orthogonal to the wall surface of the third wall portion).

Figure 12A:
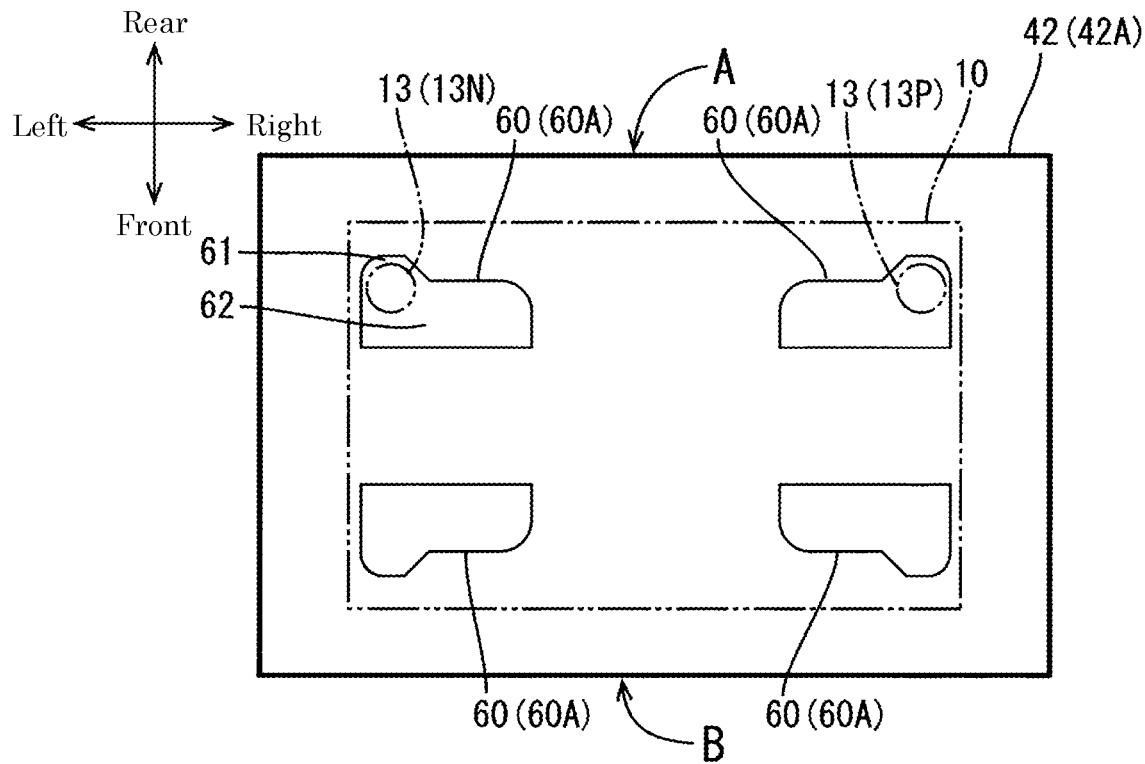
FIG. 12A is a schematic view illustrating a state where the upper buffer body is disposed on the packing box.

The positional relationship between the two terminals 13 and the four first recessed portions 60A will be described with reference to FIGS. 12A and 12B. For convenience, in FIGS. 12A and 12B, one of two long sides of the upper buffer body 42A is a long side A, and the other is a long side B. As illustrated in FIG. 12A, the four first recessed portions 60A are formed at positions where the two first recessed portions 60A are directly above the two terminals 13 of the lead-acid battery 10 when the upper buffer body 42A is disposed on the packing box 20. In other words, the terminal 13 and the projecting portion 54 do not overlap when viewed in the up-down direction (an example of a direction orthogonal to the wall surface of the third wall portion).

The left rear first recessed portion 60A illustrated in FIG. 12A will be specifically described as an example. The left rear first recessed portion 60A has the rectangular portion 62 and the expanded portion 61 expanded from the left rear to the rear side of the rectangular portion 62. When the upper buffer body 42A is disposed on the packing box 20, a part of the negative electrode external terminal 13N is located directly below the expanded portion 61. The same applies to the positive electrode external terminal 13P. That is, the reason why the expanded portion 61 is provided in the first recessed portion 60A is that the first recessed portion 60A is located directly above the terminal 13.

Figure 12B:
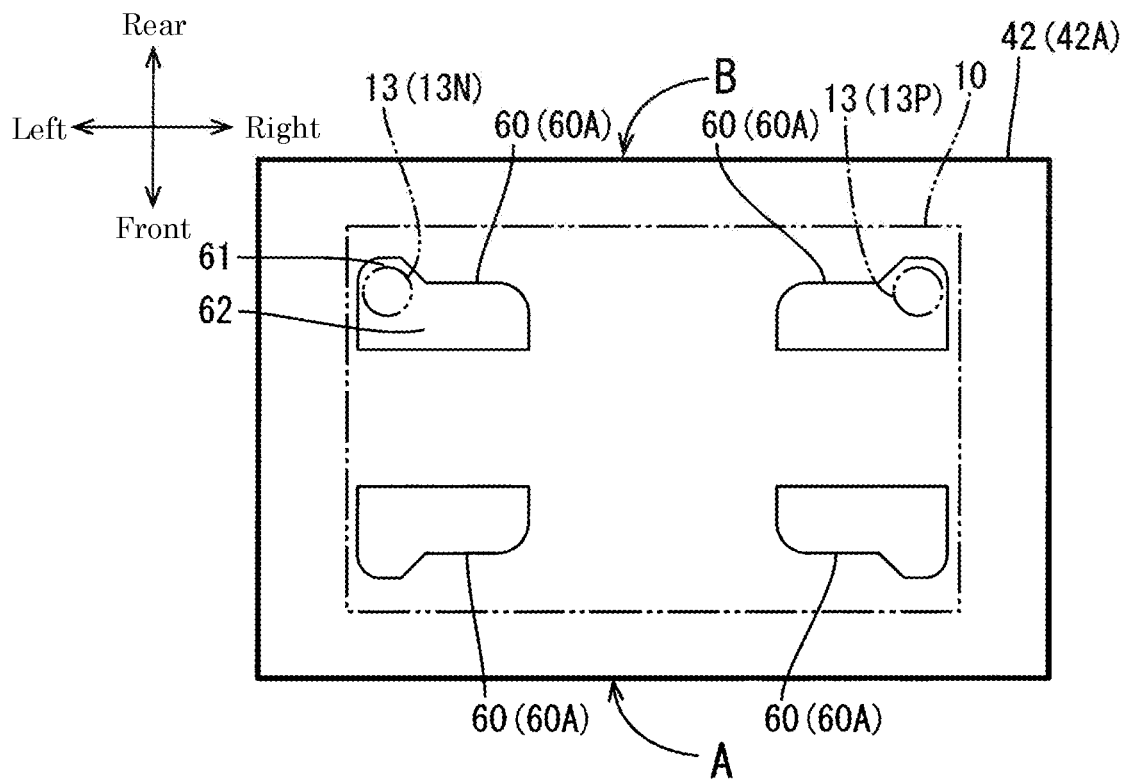
FIG. 12B is a schematic view illustrating a state where the upper buffer body illustrated in FIG. 12A is rotated by 180 degrees around a straight line perpendicular to the paper surface and disposed.

FIG. 12B illustrates a state where the upper buffer body 42A is rotated by 180 degrees around a vertical line (an example of a straight line perpendicular to the wall surface of the third wall portion) and disposed so that the long side A and the long side B are interchanged. As illustrated in FIG. 12B, even when the upper buffer body 42A is rotated by 180 degrees, two of the four first recessed portions 60A are located directly above the terminal 13. In other words, when viewed from the up-down direction, even if the upper buffer body 42A is rotated by 180 degrees around the vertical line, the terminal 13 and the projecting portion 54 do not overlap each other.

The expanded portion 61 has a certain width in the long-side direction of the lead-acid battery 10. This is to cope with lead-acid batteries 10 having different sizes. Specifically, there are a plurality of types of lead-acid batteries 10 depending on the difference in size in the long-side direction. The lead-acid batteries 10 having different sizes have different positions of the terminals 13 in the long-side direction. When the width of the expanded portion 61 in the long-side direction is increased to some extent, the same buffer body 42 can be used for a plurality of types of lead-acid batteries 10 having different sizes. Therefore, the cost of the buffer body 42 can be reduced as compared with the case where the buffer body 42 is prepared for each size of the lead-acid battery 10.

The frame portion 52 will be described with reference to FIG. 9. In a portion of the frame portion 52 extending in the left-right direction, a central portion in the left-right direction is cut out. The width of the cut-out portion in the left-right direction is about ⅓ of the width of the upper buffer body 42A in the left-right direction. Similarly, in a portion of the frame portion 52 extending in the front-rear direction, a central portion in the front-rear direction is cut out. The width of the cut-out portion in the front-rear direction is about ⅕ to ⅙ of the width of the upper buffer body 42A in the front-rear direction.

Figure 13:
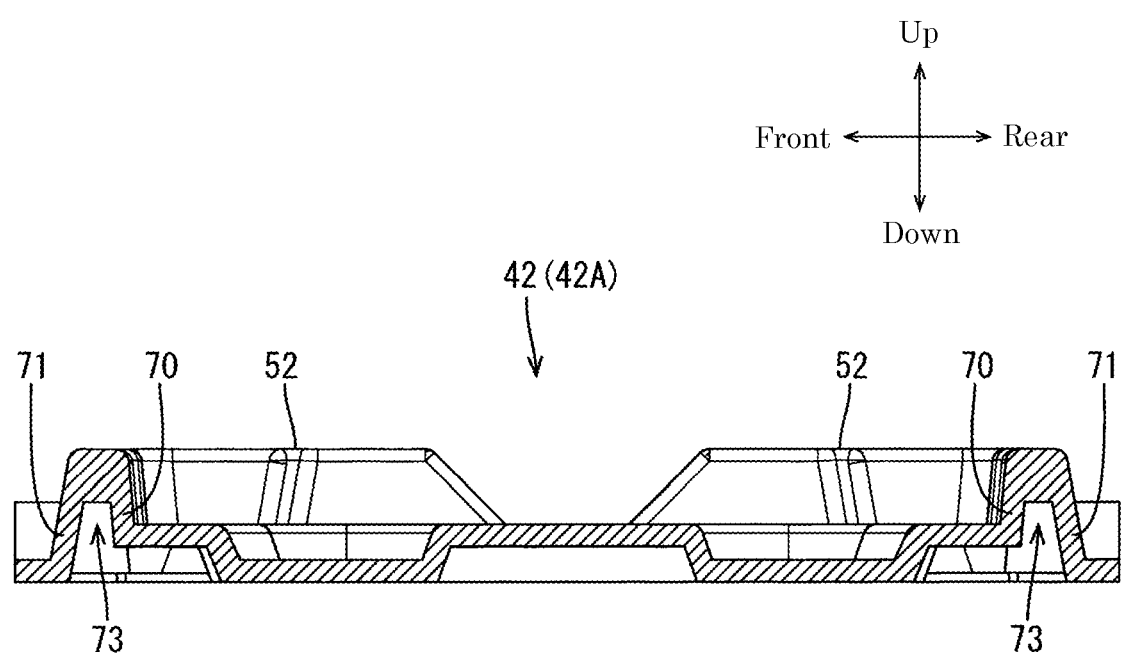
FIG. 13 is a cross-sectional view taken along line A-A illustrated in FIG. 11.

As illustrated in FIG. 13, the frame portion 52 includes a fourth side wall portion 70 having a substantially frame shape (an example of a fourth wall portion) surrounding the packing box 20, and a fifth side wall portion 71 (an example of a fifth wall portion) disposed outside the fourth side wall portion 70. An upper side of the fifth side wall portion 71 is connected to the fourth side wall portion 70, and a space 73 is provided between the fourth side wall portion 70 and the fifth side wall portion 71.

Figure 14A:
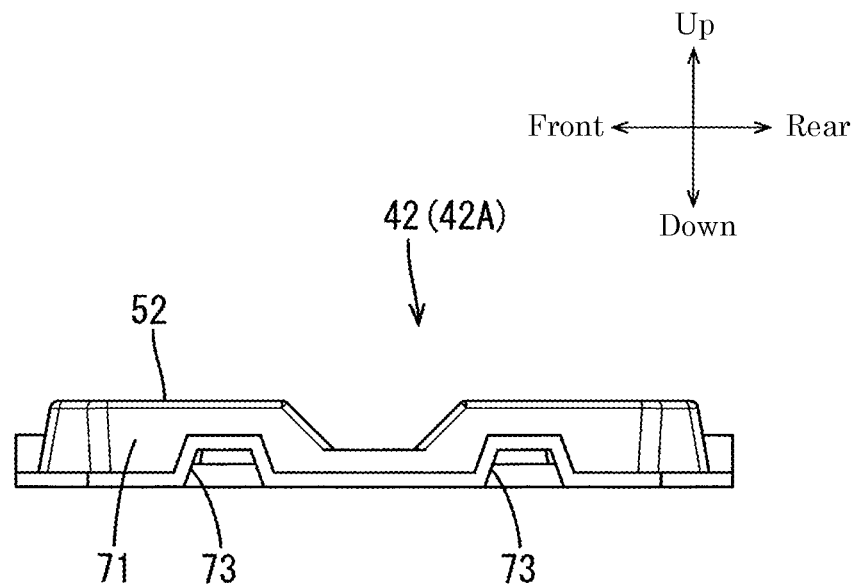
FIG. 14A is a side view of a short side surface of the upper buffer body.
Figure 14B:
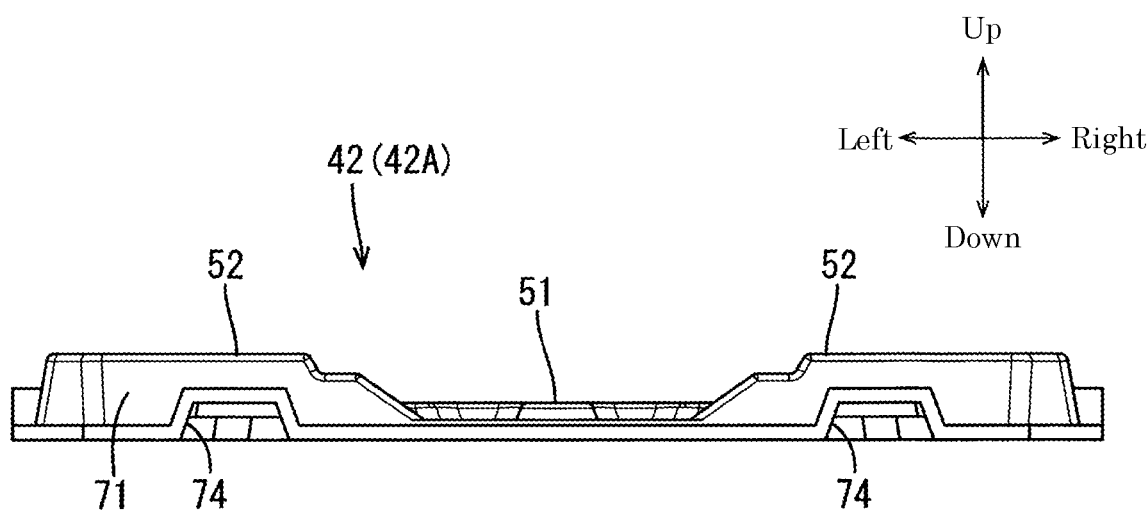
FIG. 14B is a side view of a long side surface of the upper buffer body.

As illustrated in FIG. 14A, in a portion of the fifth side wall portion 71 extending in the front-rear direction, recessed portions 73 recessed upward from a lower end surface are formed on both front and rear sides across a center in the front-rear direction. As illustrated in FIG. 14B, in a portion of the fifth side wall portion 71 extending in the left-right direction, recessed portions 74 recessed upward from the lower end surface are formed on both left and right sides across a center in the left-right direction. These recessed portions 73 and 74 are for improving the strength of the fifth side wall portion 71.

As illustrated in FIG. 9 and FIG. 11, the flange portion 53 projecting in the horizontal direction from a lower end portion of a peripheral surface of the frame portion 52 is integrally formed on the entire periphery of the frame portion 52. The flange portion 53 is for improving the strength of the upper buffer body 42A.

As described above, when the buffer body 42 is used as the lower buffer body 42B, the buffer body 42 is disposed below the packing box 20 put in the inner bag 41. When the buffer body 42 is used as the lower buffer body 42B, the granular absorbent material 43 is also disposed in the recessed portions 60 of the lower buffer body 42B. That is, the recessed portions 60 also have a role of accommodating the absorbent material 43 when the buffer body 42 is used as the lower buffer body 42B.

(5) Absorption of Impact by Buffer Body

As illustrated in FIGS. 15 and 16, when the transport box 30 falls with its upper surface facing downward, the distal end portions 26 of the flaps 24 of the packing box 20 are pressed downward by the lead-acid battery 10. At this time, since the first projecting portion 54A is immediately below the distal end portions 26, the distal end portions 26 are pressed toward the first projecting portion 54A by the lead-acid battery 10.

Here, as described above, the upper buffer body 42A is a hard mold, and the upper wall portion 51 has a wall thickness of about 5 mm to 6 mm, and thus has a certain degree of strength. Therefore, when the lead-acid battery 10 presses the distal end portions 26 against the first projecting portion 54A, the distal end portions 26 are supported from below by the first projecting portion 54A. Therefore, the distal end portions 26 are sandwiched between the lead-acid battery 10 and the first projecting portion 54A and crushed so as to be buckled.

Further, since the surface side of the first projecting portion 54A on the side opposite to the surface facing the upper wall portion 23 of the packing box 20 is hollow, when the transport box 30 falls with its upper surface facing downward, the first projecting portion 54A pressed downward by the distal end portions 26 of the flaps 24 is easily bent downward. Therefore, the first projecting portion 54A also functions as a cushion that buffers the impact. Furthermore, since the recessed portion 60 of the upper buffer body 42A bends so as to be crushed when receiving an impact, the recessed portion 60 also functions as a cushion that buffers the impact.

Further, when the transport box 30 falls with its upper surface facing downward, the terminal 13 presses the upper wall portion 23 of the packing box 20 downward. However, since the first recessed portion 60A of the upper buffer body 42A is provided below the terminal 13, the upper wall portion 23 pressed downward by the terminal 13 bends downward using the space of the first recessed portion 60A to function as a cushion.

Even when the transport box 30 falls with its bottom surface facing downward, the impact is buffered by the recessed portion 60 being bent so as to be crushed.

When the transport box 30 falls with its side surface facing downward, the impact of the side surface falling is buffered by bending of the fourth side wall portion 70 toward the fifth side wall portion 71 or bending of the fifth side wall portion 71 toward the fourth side wall portion 70.

When the transport box 30 falls with its corner portion facing downward, the corner portion of the packing box 20 is separated from the buffer body 42 by the fourth recessed portions 60D formed in the buffer body 42 and the recessed portions 65 formed at the inner corner portion of the fourth side wall portion 70, so that concentration of an impact on the corner portion of the lead-acid battery 10 is suppressed.

(6) Height and Strength of Buffer Body

When the height of the buffer body 42 is high, it is necessary to enlarge the transport box 30. On the other hand, if the height of the buffer body 42 is low, the impact may not be sufficiently buffered. Therefore, in order to sufficiently buffer the impact without enlarging the transport box 30, the height of the buffer body 42 is preferably 8 mm to 15 mm.

If the strength of the buffer body 42 is low, when the distal end portions 26 of the flaps 24 are pressed toward the first projecting portion 54A due to upper surface falling, the distal end portions 26 are hardly crushed due to the low strength of the first projecting portion 54A, and there is a possibility that the impact cannot be sufficiently buffered. Therefore, in order to sufficiently buffer the impact by the distal end portions 26, the buffer body 42 preferably has strength enough to crush the distal end portion 26. Specifically, the strength of the buffer body 42 is preferably 1000 kgf or more.

(7) Effects of Embodiment

According to the transport structure 1 for the lead-acid battery 10, when the transport box 30 falls with its upper surface facing downward, the distal end portions 26 of the flaps 24 is crushed by being sandwiched between the lead-acid battery 10 and the upper wall portion 51 of the upper buffer body 42A, so that the impact of the falling is buffered. Therefore, according to the transport structure 1 for the lead-acid battery 10, when the lead-acid battery 10 is transported as an object to be transported, it is possible to suppress the lead-acid battery 10 from falling and being damaged during transportation.

According to the transport structure 1 for the lead-acid battery 10, since at least parts of the distal end portions 26 of the flaps 24 overlaps the projecting portion 54 when viewed in the up-down direction (direction orthogonal to the wall surface of the third wall portion), the distal end portions 26 are sandwiched between the lead-acid battery 10 and the projecting portion 54 and crushed, so that the impact of the falling is buffered.

According to the transport structure 1 for the lead-acid battery 10, since the entire distal end portions 26 of the flaps 24 overlap the projecting portion 54 when viewed from the up-down direction, the impact of the falling is more reliably buffered as compared with a case where only parts of the distal end portion 26 overlap the projecting portion 54.

According to the transport structure 1 for the lead-acid battery 10, since the surface side of the first projecting portion 54A on the side opposite to the surface facing the upper wall portion 23 of the packing box 20 is hollow, the projecting portion 54 also functions as a cushion that buffers an impact. This further buffers the impact of the falling Furthermore, according to the transport structure 1 for the lead-acid battery 10, since the recessed portion 60 also functions as a cushion that buffers the impact, the impact of the falling is further buffered.

According to the transport structure 1 for the lead-acid battery 10, the upper wall portion 23 pressed downward by the terminals 13 bends downward using the space of the recessed portions 60, thereby functioning as a cushion. As a result, the impact applied to the terminals 13 is buffered, and the impact is dispersed to the entire upper wall portion 23 of the packing box 20. Therefore, it is possible to suppress the terminals 13 from being damaged due to concentration of the impact on the terminals 13.

According to the transport structure 1 for the lead-acid battery 10, since the width of the distal end portion 26 of the flap 24 in the up-down direction is wider than the width of the terminal 13 in the up-down direction, the lead-acid battery 10 comes into contact with the distal end portions 26 of the flaps 24 before the terminals 13 come into contact with the upper wall portion 23 (second wall portion) of the packing box 20, and the crushing of the distal end portions 26 is started. Therefore, as compared with a case where the width of the distal end portion 26 of the flap 24 in the up-down direction is the same as the width of the terminal 13 in the up-down direction or narrower than the width of the terminal 13 in the up-down direction, damage to the terminal 13 can be more reliably suppressed.

According to the transport structure 1 for the lead-acid battery 10, even if the upper buffer body 42A is rotated by 180 degrees around the vertical line and disposed, the terminal 13 and the projecting portion 54 do not overlap each other, and thus, an operator does not need to pay attention to the direction of the upper buffer body 42A when arranging the upper buffer body 42A. Therefore, operability is improved.

According to the transport structure 1 for the lead-acid battery 10, when the transport box 30 falls with its side surface facing downward, the fifth side wall portion 71 bends using the space 73 (or the fourth side wall portion 70 bends using the space 73), thereby functioning as a cushion that buffers the impact applied to the lead-acid battery 10. Therefore, it is possible to buffer the impact when the transport box 30 falls with its side surface facing downward.

According to the transport structure 1 for the lead-acid battery 10, it is possible to suppress the concentration of the impact at the corner portion of the lead-acid battery 10 when the transport box 30 falls with its corner portion facing downward, so that it is possible to reduce the possibility that the impact concentrates at the corner portion and the lead-acid battery 10 is damaged.

According to the transport structure 1 for the lead-acid battery 10, since the buffer body 42 is made of pulp mold, even if the electrolyte solution leaks, the electrolyte solution can be absorbed to some extent by the buffer body 42 made of pulp mold. Therefore, when the lead-acid battery 10 falls during transportation and the lead-acid battery 10 is damaged, leakage of the electrolyte solution can be more reliably suppressed.

For example, the buffer body can be formed by overlapping cardboard plates, but since the cardboard plates have a smooth surface, there is a problem that the packing box 20 slides inside the transport box 30 during transportation, and the position is difficult to be stabilized. On the other hand, since a buffer body made of pulp mold has a rough surface, there is also an advantage that the packing box 20 is difficult to slide.

In general, since the cardboard plate has sharp corners, an operator may be injured when accommodating the buffer body in the outer bag 44 or the outer bag 44 may be broken at the corners of the cardboard. Since the buffer body made of pulp mold has fewer sharp corners than a buffer body made of cardboard, it is possible to reduce the possibility that the operator is injured or the outer bag 44 is broken.

When the buffer body is formed by overlapping the cardboard plates, an adhesive is required. However, when the buffer body is made of pulp mold, an adhesive is not required, and a process of overlapping the cardboard plates is not required. Therefore, there is also an advantage that the buffer body can be manufactured at a lower cost than that of the buffer body made of cardboard plates.

Since the pulp mold is easy to mold a complicated shape as compared with the buffer body made of cardboard plates, there is also an advantage that the shape can be easily devised so as to buffer the impact.

For example, it is also possible to use a buffer body made of foamed polystyrene as the buffer body, but the foamed polystyrene has a problem that the combustion temperature becomes high during incineration, and an incinerator is damaged early, and a problem that a harmful gas is generated. On the other hand, the buffer body 42 made of pulp mold has an advantage that such problems can be improved.

Other Embodiments

The present invention is not limited to the embodiments described with reference to the above description and drawings, and for example, the following embodiments are also included in the technical scope of the present invention.

(1) In the above embodiment, the case where the entire distal end portions 26 of the flaps 24 are located directly below the first projecting portion 54A has been described as an example. On the other hand, the distal end portions 26 may be provided only at positions overlapping at least the terminals 13 when viewed from the front-rear direction. This is because the impact applied to the terminal 13 can be buffered to some extent only by providing the distal end portions 26 at positions overlapping the terminal 13 when viewed from the front-rear direction.

(2) In the above embodiment, the case where the upper wall portion 51 (third wall portion) of the buffer body 42 has the projecting portion 54 has been described as an example, but the upper wall portion 51 may not include the projecting portion 54. In other words, the upper wall portion 51 may have a flat plate shape.

(3) In the above embodiment, the case where the surface side of the first projecting portion 54A of the buffer body 42 on the side opposite to the surface facing the upper wall portion 23 is hollow has been described as an example, but the surface side on the opposite side may not be hollow. In this case, since the first projecting portion 54A is less likely to bend due to the floor under the first projecting portion 54A, the strength of the buffer body 42 may be reduced as compared with the case where the surface side on the opposite side is hollow.

(4) In the above embodiment, the case where the packing box 20 and the buffer body 42 are accommodated in the transport box 30 has been described as an example, but these may be transported in a state of not being accommodated in the transport box 30. In this case, for example, the buffer body 42 may be fixed to the packing box 20 by a polypropylene (PP) band, or the buffer body 42 may be fixed to the packing box 20 by another method.

(5) In the first embodiment described above, the case where the buffer body 42 is disposed on both the upper and lower sides of the packing box 20 has been described as an example, but the buffer body 42 may be disposed only on the upper side.

(6) In the first embodiment described above, the case has been described as an example where the first recessed portions 60A are formed on both sides in the front-rear direction with the center in the front-rear direction as a reference, and the first recessed portions 60A are located directly above the terminals 13 even if the buffer body 42 is rotated by 180 degrees around the vertical line and disposed. On the other hand, the first recessed portion 60A may be formed only on one side in the front-rear direction with the center in the front-rear direction as a reference. However, in that case, it is necessary to pay attention to the direction when arranging the upper buffer body 42A.

Figure 17:
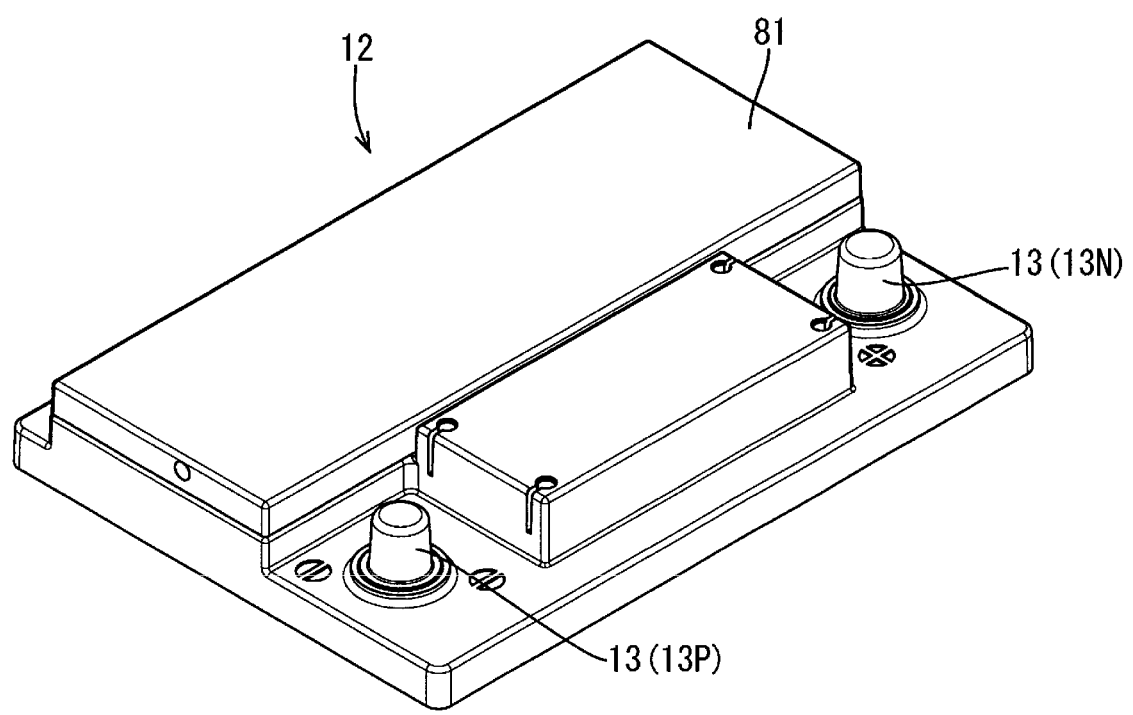
FIG. 17 is a perspective view of a lid member of a lead-acid battery according to another embodiment.

(7) In the above embodiment, the case where the terminals 13 protrude upward from the upper surface 10A of the lead-acid battery 10 has been described as an example. On the other hand, as illustrated in FIG. 17, a T-shaped convex part 81 may be provided on the upper surface of the lid member 12 of the lead-acid battery 10, and the terminals 13 may be provided at portions other than the T-shaped convex part 81.

(8) In the above embodiment, the case where the terminals 13 are provided on the upper surface 10A of the lead-acid battery 10 has been described as an example, but the surface on which the terminals 13 are provided is not limited to the upper surface 10A. For example, the terminals 13 may be provided on the side surface of the lead-acid battery 10.

(9) In the first embodiment described above, the case where the distal end portions 26 are provided in both of the two flaps 24A and 24B has been described as an example, but the distal end portion 26 may be provided only in one of the flaps 24.

(10) In the first embodiment described above, the case where the two terminals 13 are provided on one side of the lead-acid battery 10 in the short-side direction has been described as an example, but the two terminals may be provided on one side of the lead-acid battery 10 in the long-side direction.

(11) In the first embodiment described above, the lead-acid battery 10 mounted on an automobile has been described as an example, but the lead-acid battery 10 is not limited to one mounted on an automobile. For example, the lead-acid battery 10 may be mounted on a motorcycle or may be used for other purposes.

DESCRIPTION OF REFERENCE SIGNS

1: transport structure for lead-acid battery
10: lead-acid battery
10A: upper surface (example of surface facing second wall portion in lead-acid battery)
13: terminal
20: packing box
21: side wall portion (two side wall portions having wider width in lateral direction among four side wall portions are examples of first wall portions)
23: upper wall portion (example of second wall portion)
24A, 24B: flap
26: distal end portion
42A: upper buffer body (example of buffer body)
51: upper wall portion (example of third wall portion)
54: projecting portion
70: fourth side wall portion (example of fourth wall portion)
71: fifth side wall portion (example of fifth wall portion)

The invention claimed is:

1. A transport structure for a lead-acid battery comprising:
a packing box in which a lead-acid battery is packed, in which a second wall portion is formed by two flaps extending from two first wall portions facing each other of the packing box, and in which a distal end portion of at least one of the two flaps is bent and inserted into the packing box; and
a buffer body disposed outside the second wall portion, the buffer body including a third wall portion facing the second wall portion,
wherein the third wall portion has a projecting portion projecting toward the second wall portion, and at least a part of the distal end portion of the at least one of the two flaps overlaps the projecting portion when viewed from a direction orthogonal to a wall surface of the third wall portion, and
a terminal is provided on a surface of the lead-acid battery facing the second wall portion, and the terminal and the projecting portion do not overlap when viewed from the direction orthogonal to the wall surface of the third wall portion.

2. The transport structure for a lead-acid battery according to claim 1, wherein when the packing box falls in a posture in which a surface of the lead-acid battery facing the second wall portion faces downward, the distal end portion of the at least one of the two flaps is sandwiched between the lead-acid battery and the third wall portion and crushed, so that an impact of the falling is buffered.

3. The transport structure for a lead-acid battery according to claim 1, wherein the entire distal end portion of the at least one of the two flaps overlaps the projecting portion as viewed from the direction orthogonal to the wall surface of the third wall portion.

4. The transport structure for a lead-acid battery according to claim 1, wherein a surface side of the projecting portion on a side opposite to a surface facing the second wall portion is hollow.

5. The transport structure for a lead-acid battery according to claim 1,
wherein the terminal is provided on any one side in a short-side direction with a center in the short-side direction of the lead-acid battery as a reference or provided on any one side in a long-side direction with a center in the long-side direction of the lead-acid battery as a reference when viewed from the direction orthogonal to the wall surface of the third wall portion, and wherein even when the buffer body is rotated by 180 degrees around a straight line perpendicular to the wall surface of the third wall portion and disposed, the terminal and the projecting portion do not overlap when viewed from the direction orthogonal to the wall surface of the third wall portion.

6. The transport structure for a lead-acid battery according to claim 1, wherein a width of the distal end portion of the at least one of the two flaps in the direction orthogonal to the wall surface of the third wall portion is wider than a width of the terminal in the direction orthogonal to the wall surface of the third wall portion.

7. The transport structure for a lead-acid battery according to claim 1, further comprising:
   a fourth wall portion having a frame shape that is continuous with a peripheral edge portion of the third wall portion and surrounds the packing box; and
   a fifth wall portion having a frame shape that is connected to the fourth wall portion and surrounds the fourth wall portion,
   wherein a space is provided between the fourth wall portion and the fifth wall portion.

8. The transport structure for a lead-acid battery according to claim 7, wherein the third wall portion and the fourth wall portion are recessed so as to be separated from a corner portion of the packing box.

9. The transport structure for a lead-acid battery according to claim 1, wherein the buffer body is made of pulp mold.

* * * * *